C. F. PYM.
LASTING MACHINE.
APPLICATION FILED DEC. 11, 1913.
1,274,590.
Patented Aug. 6, 1918.
16 SHEETS—SHEET 10.
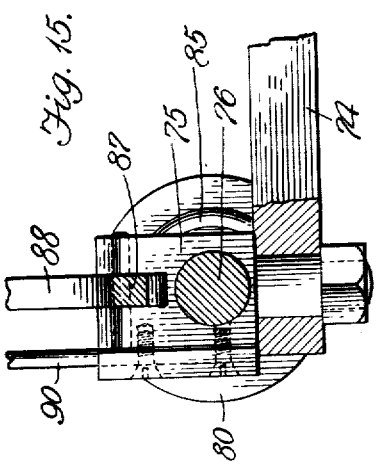
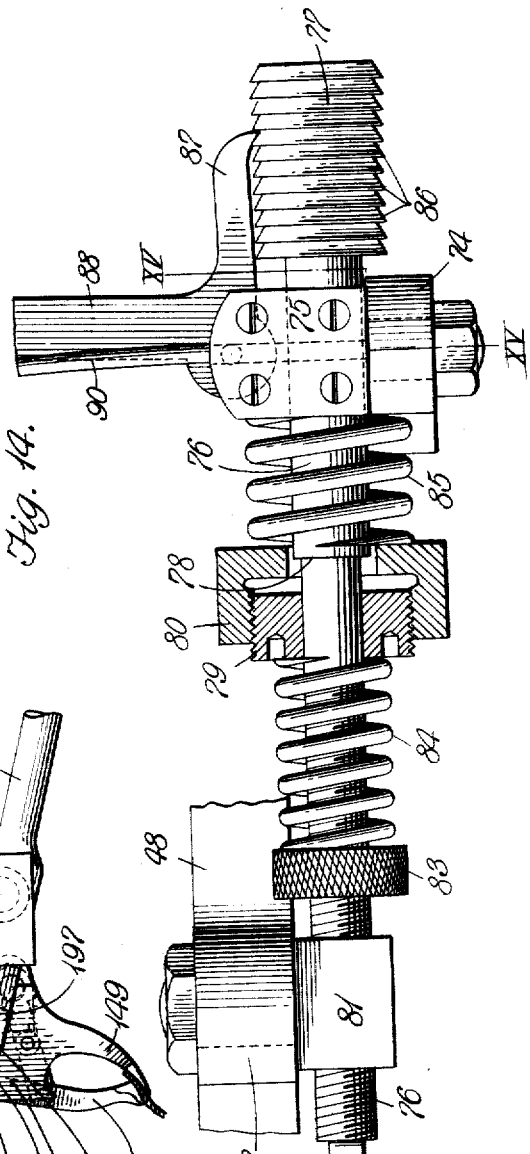
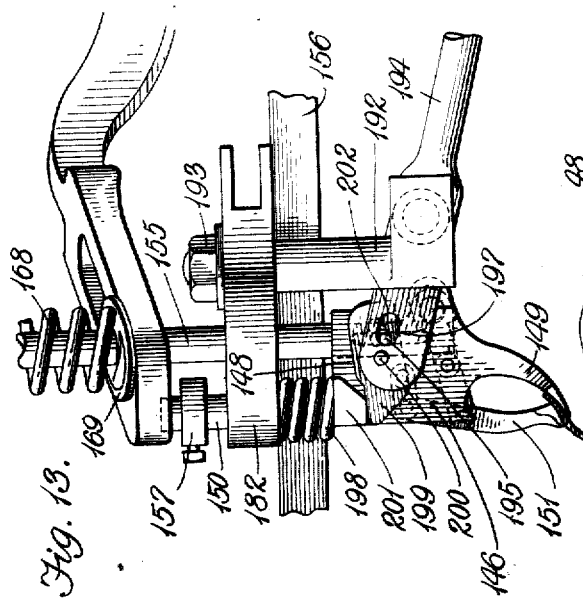
Inventor
Charles F. Pym,

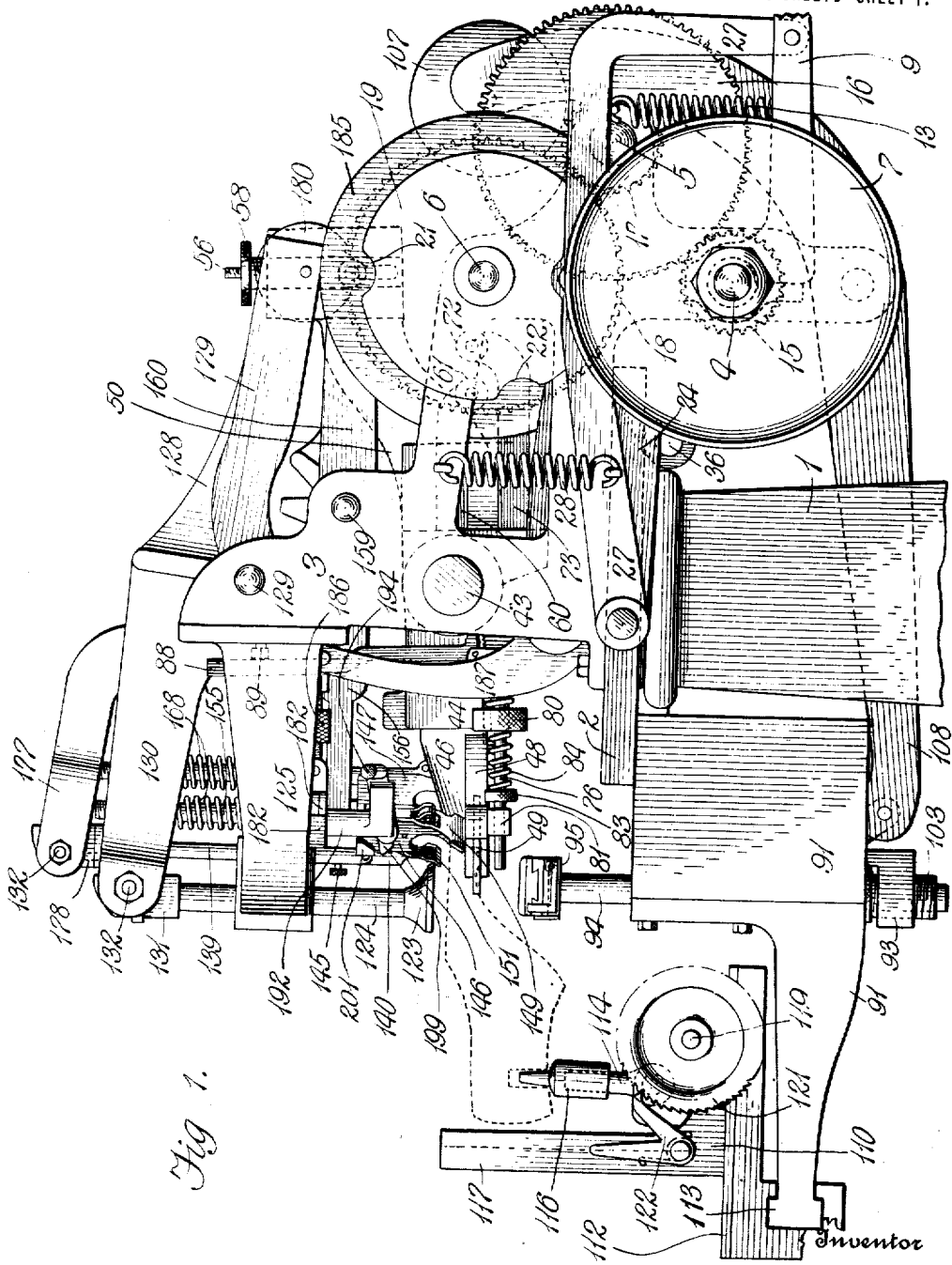

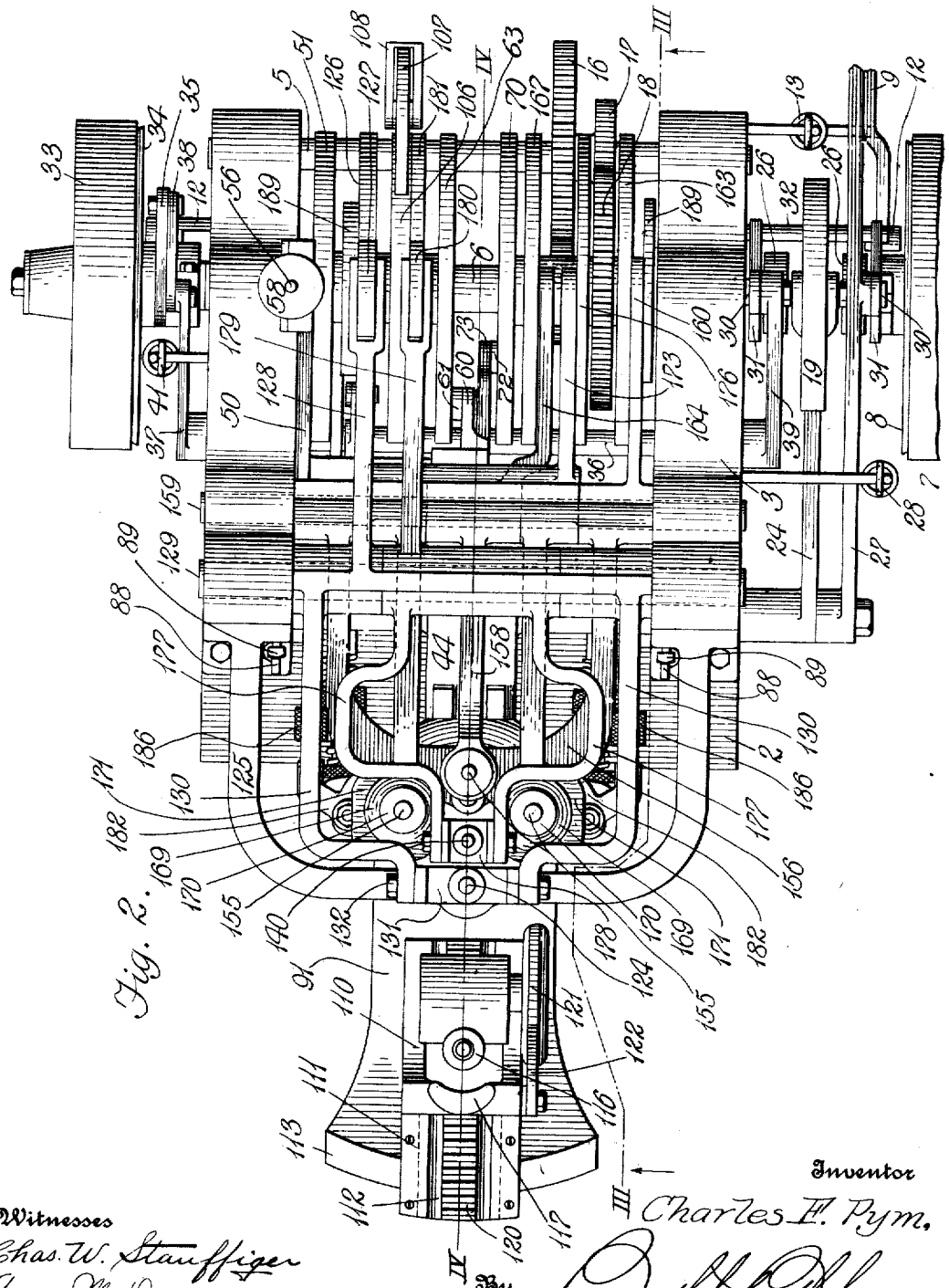

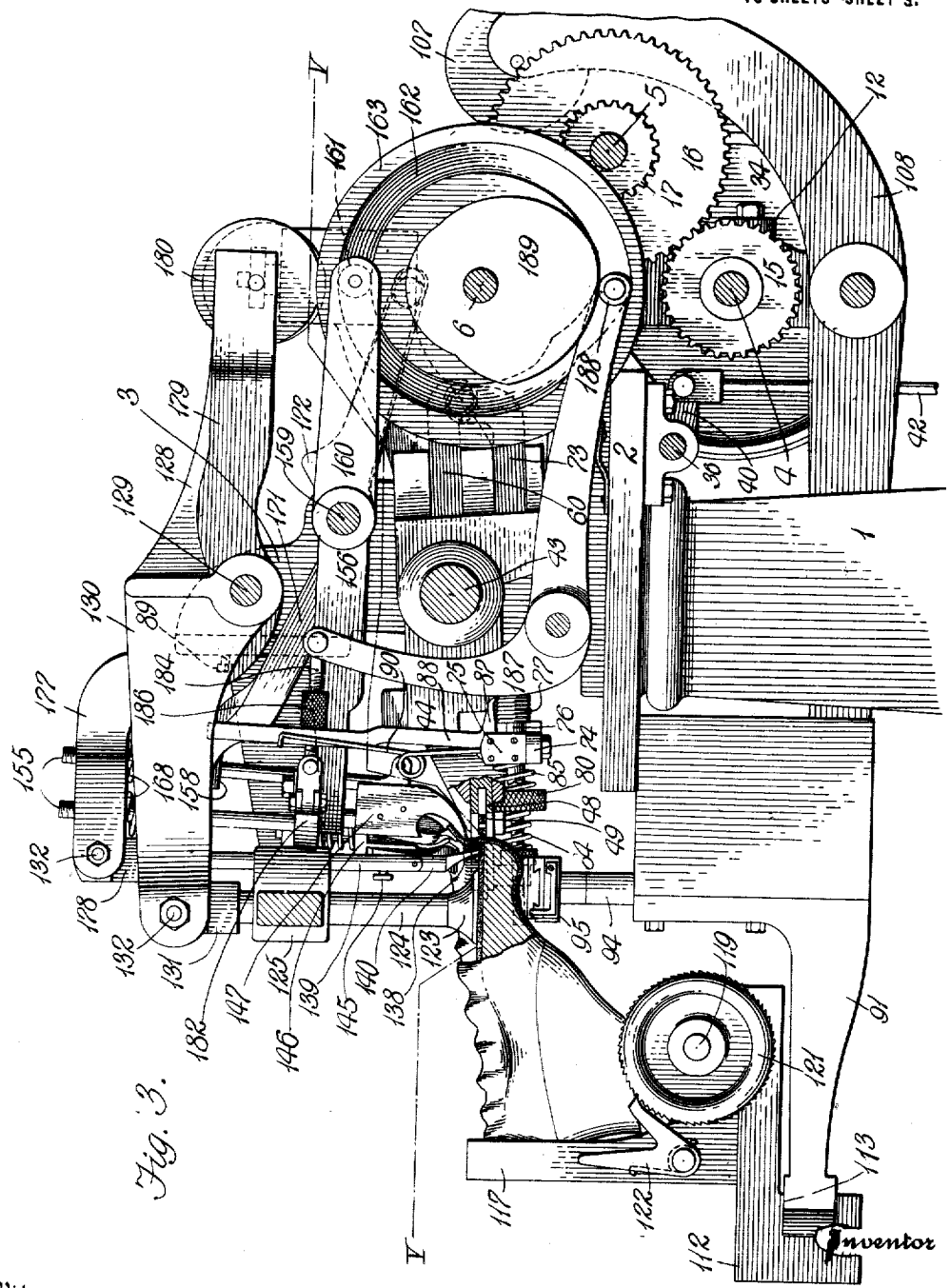

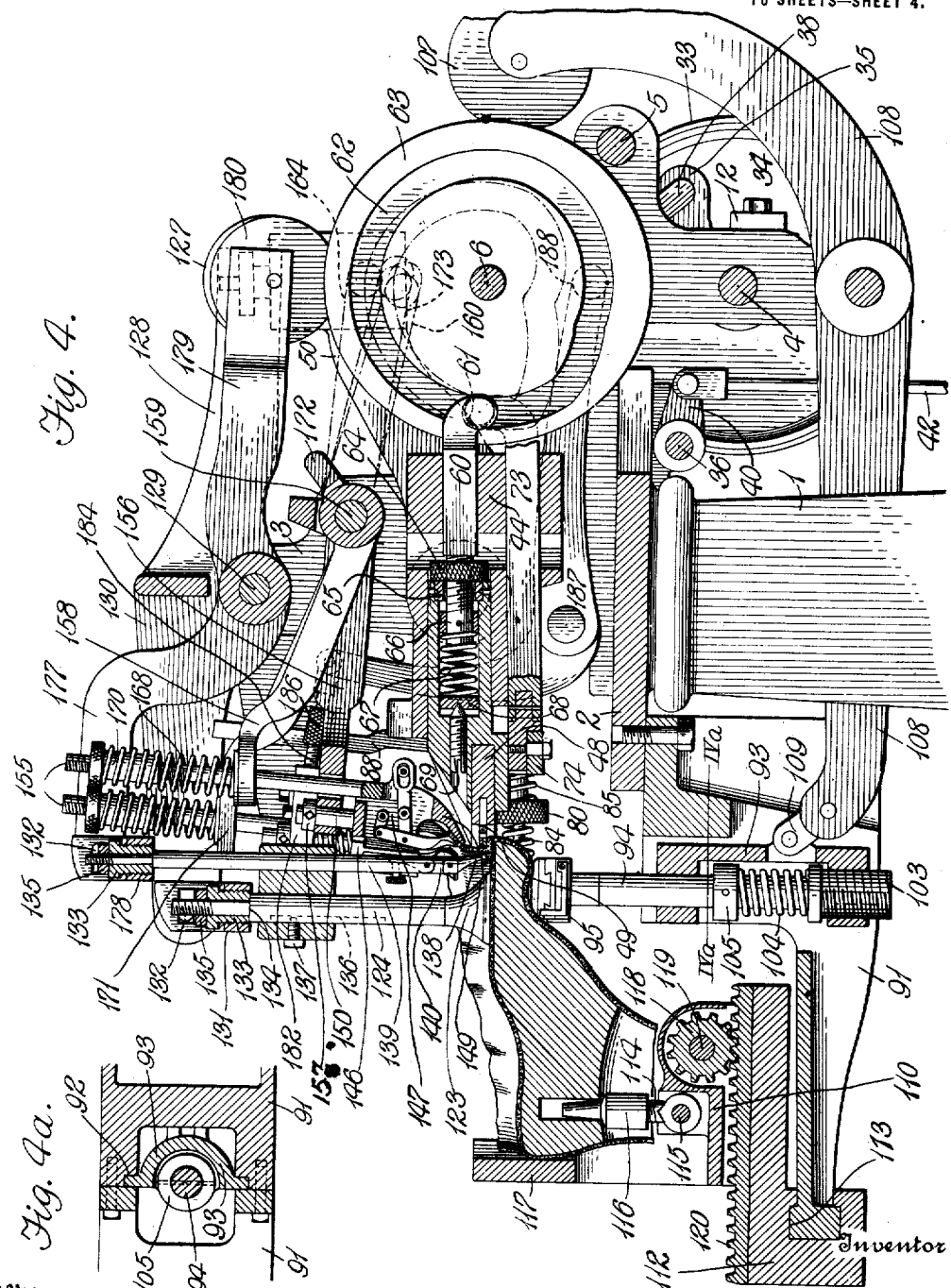

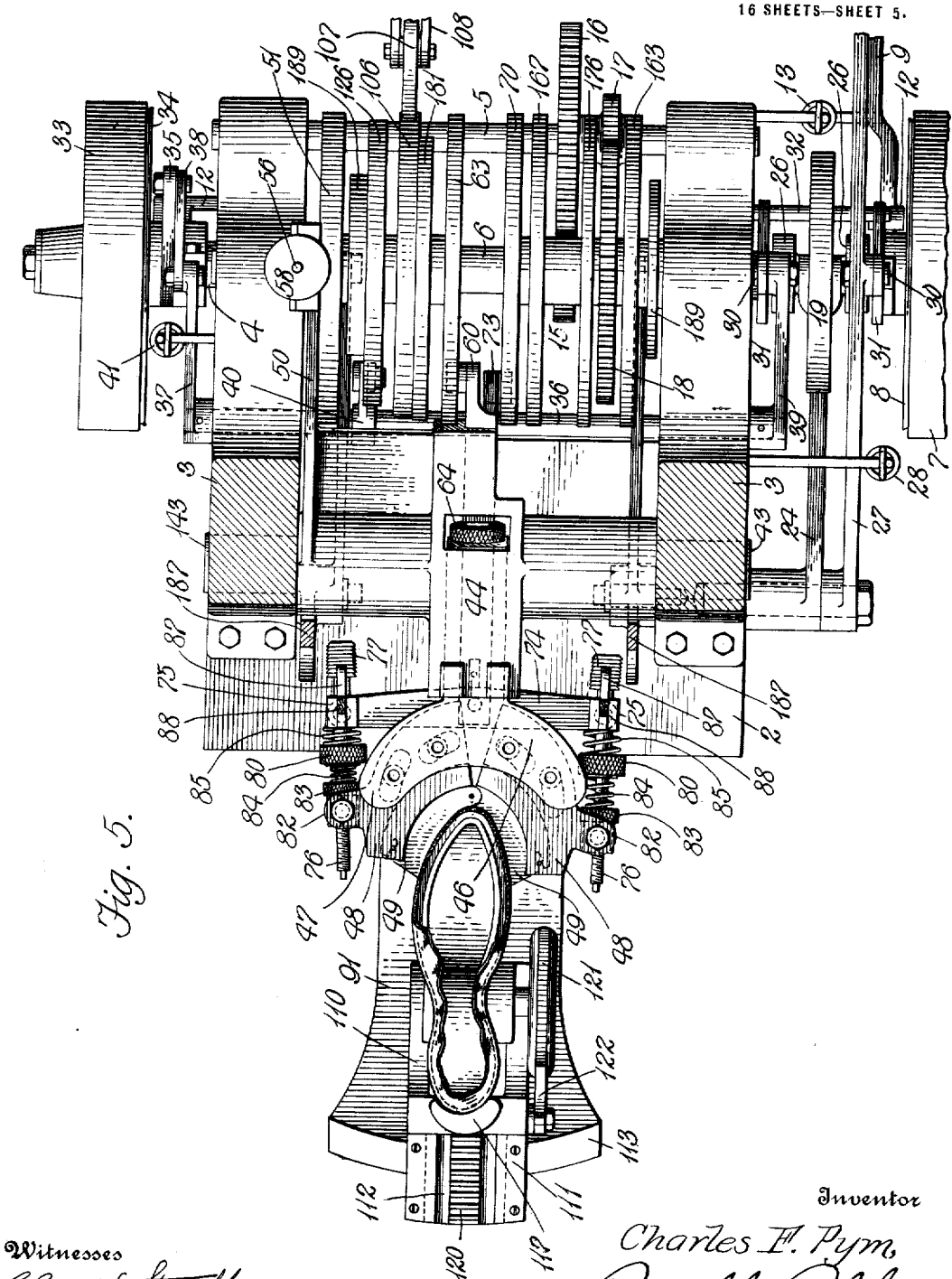

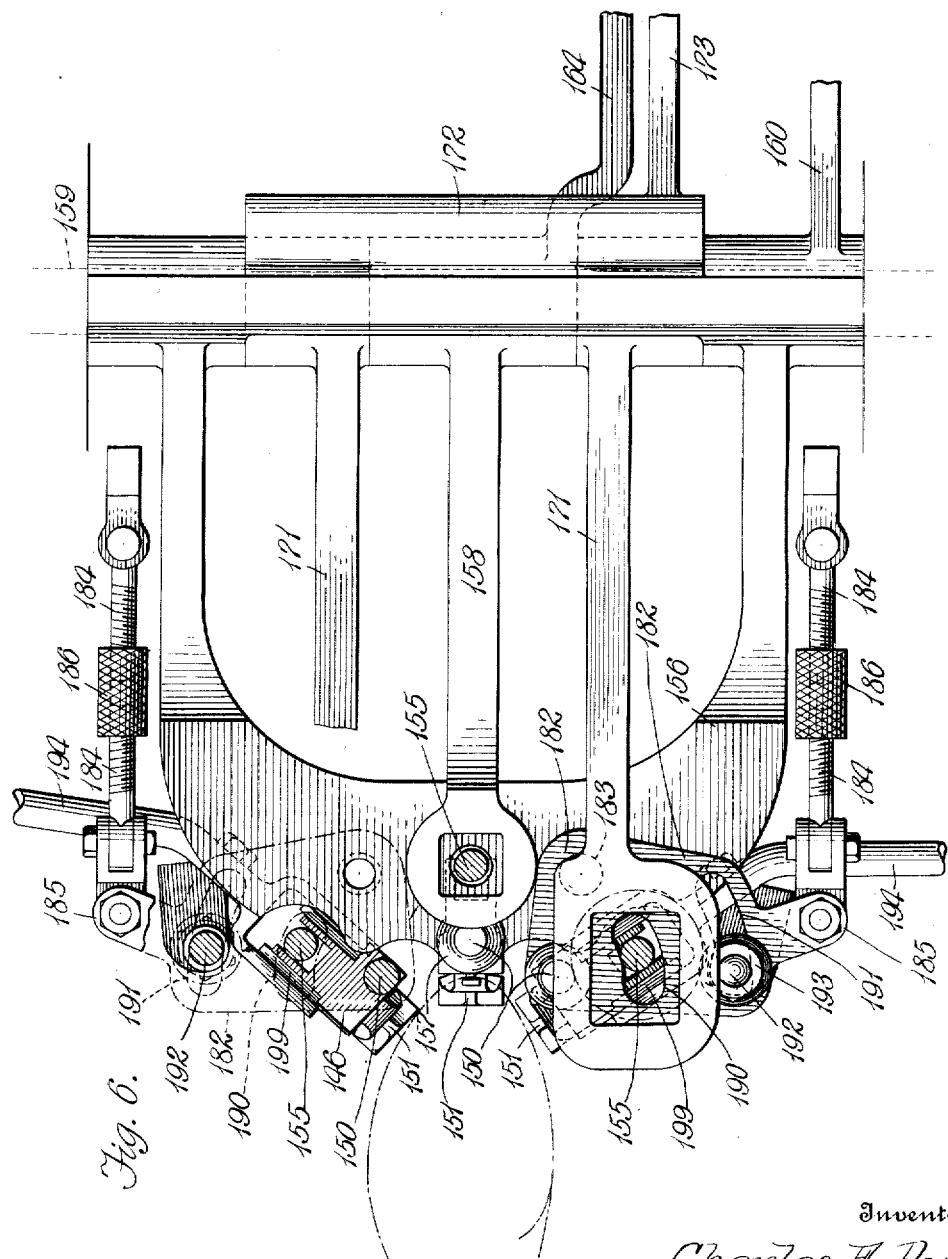

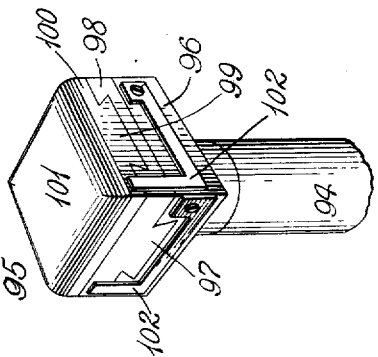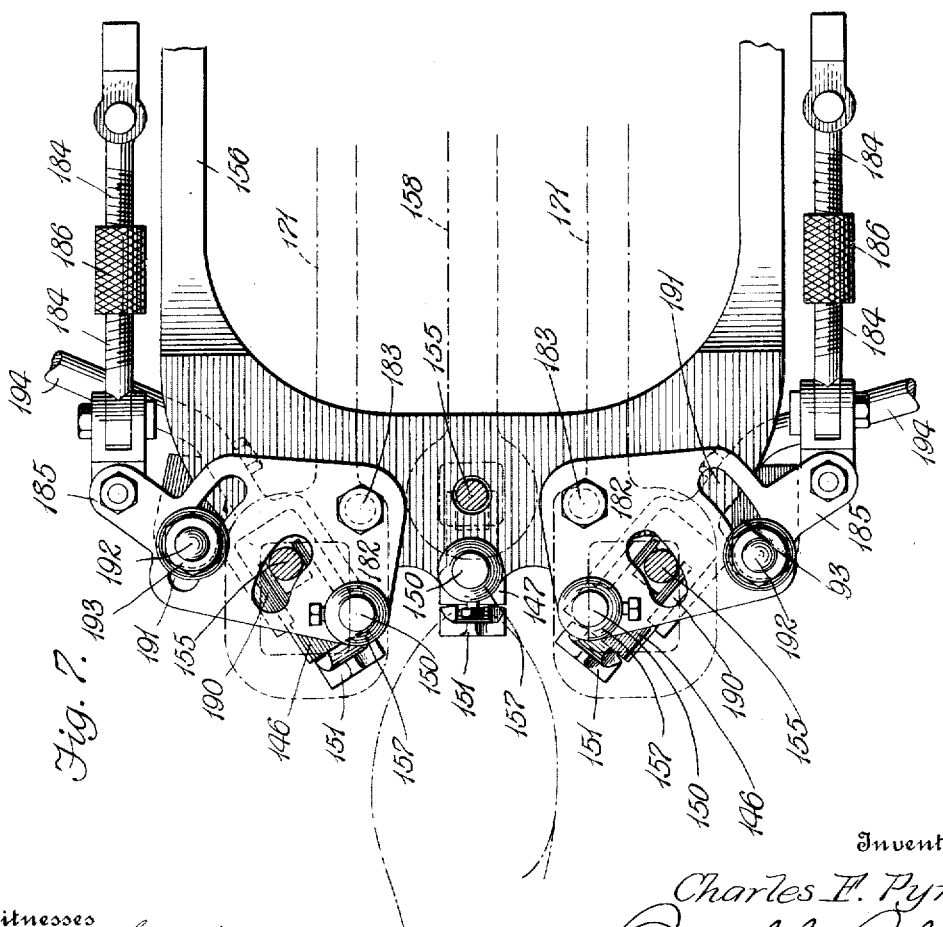

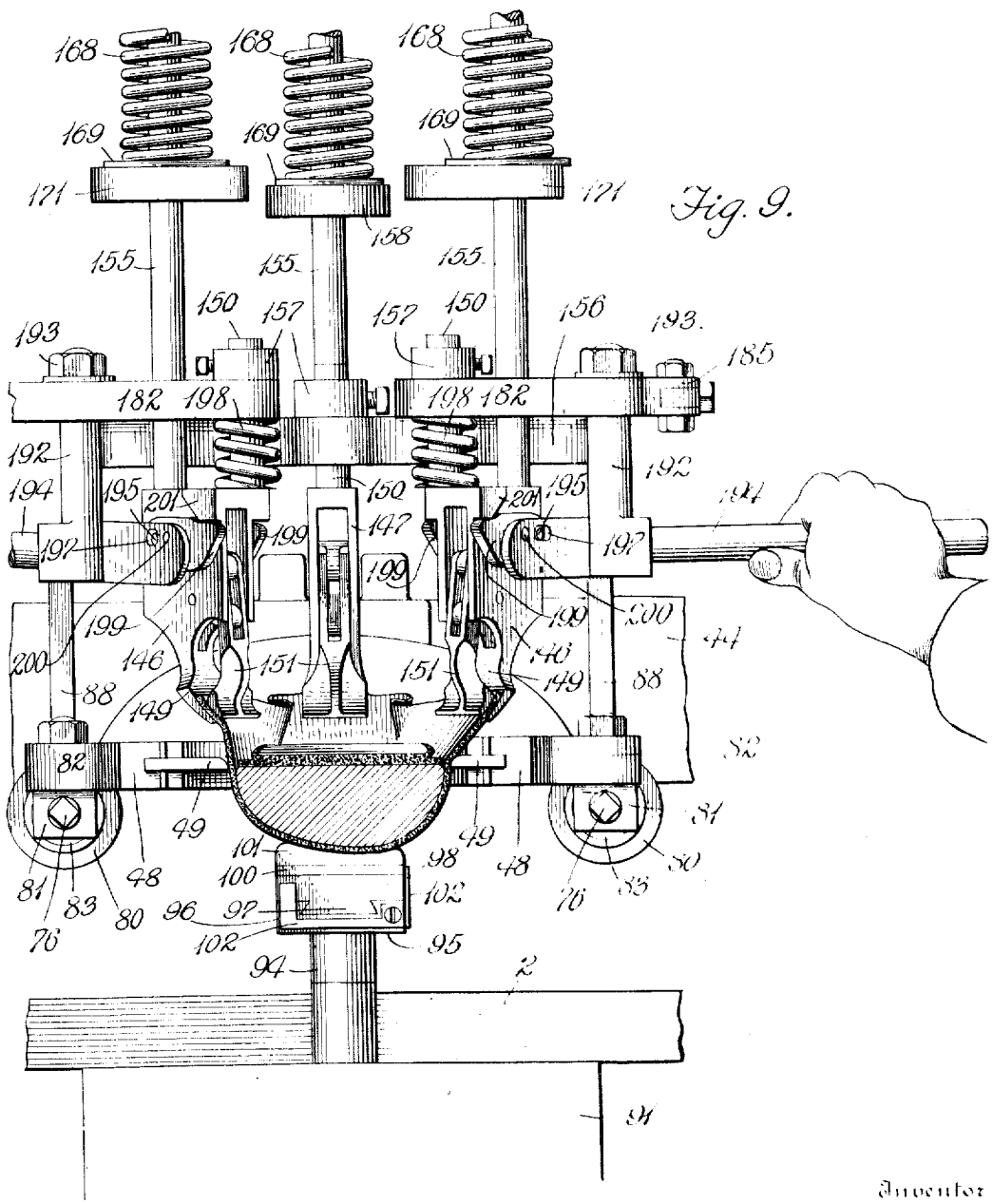

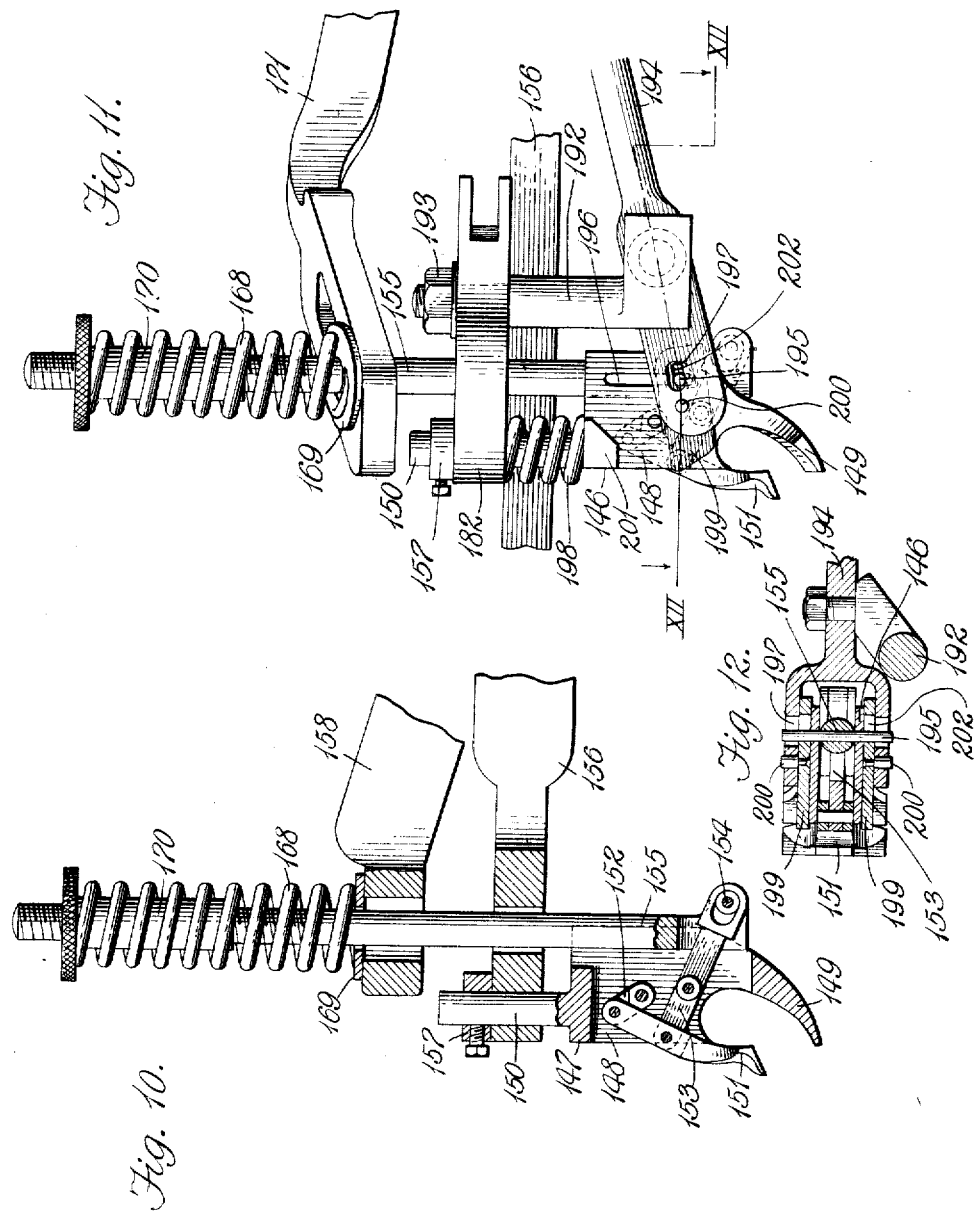

C. F. PYM.
LASTING MACHINE.
APPLICATION FILED DEC. 11, 1913.
1,274,590.
Patented Aug. 6, 1918.
16 SHEETS—SHEET 11.
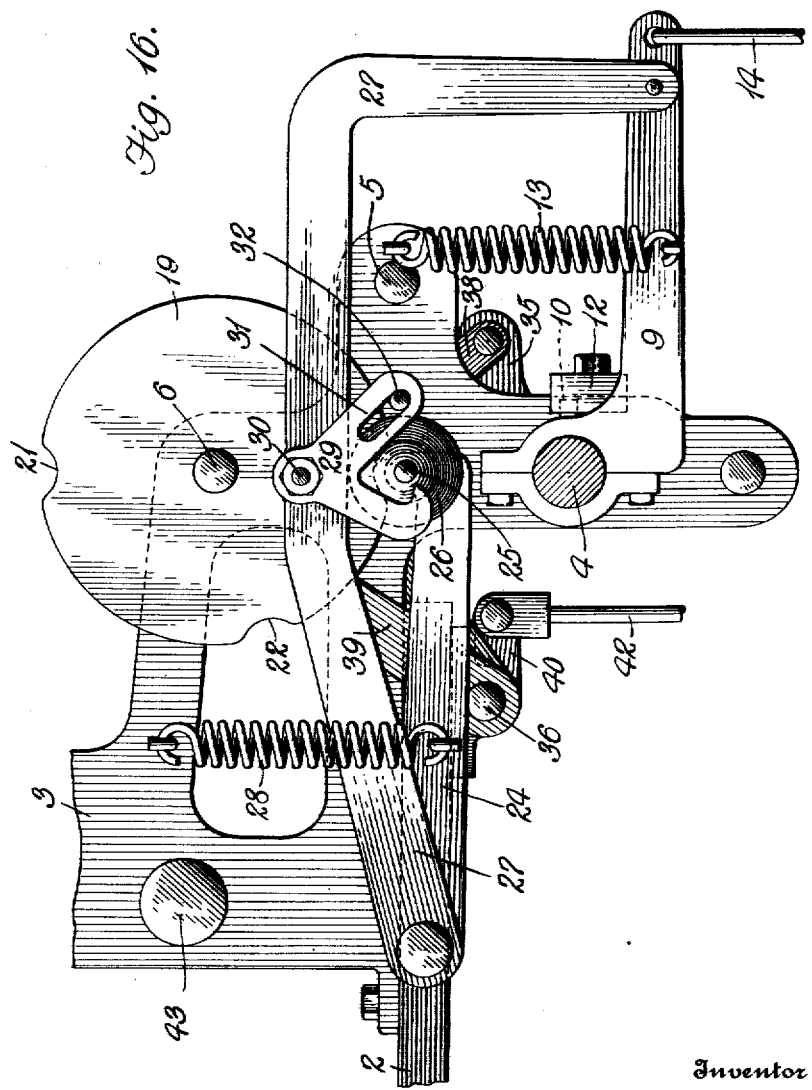

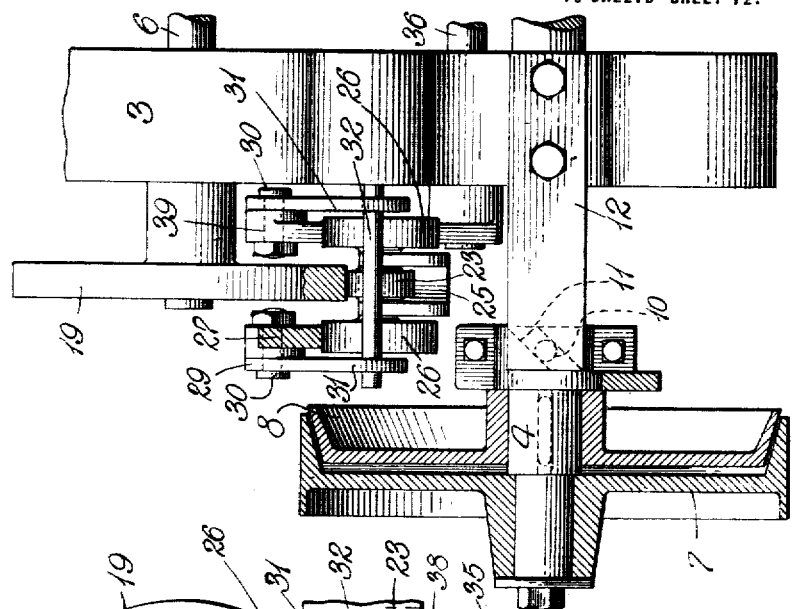

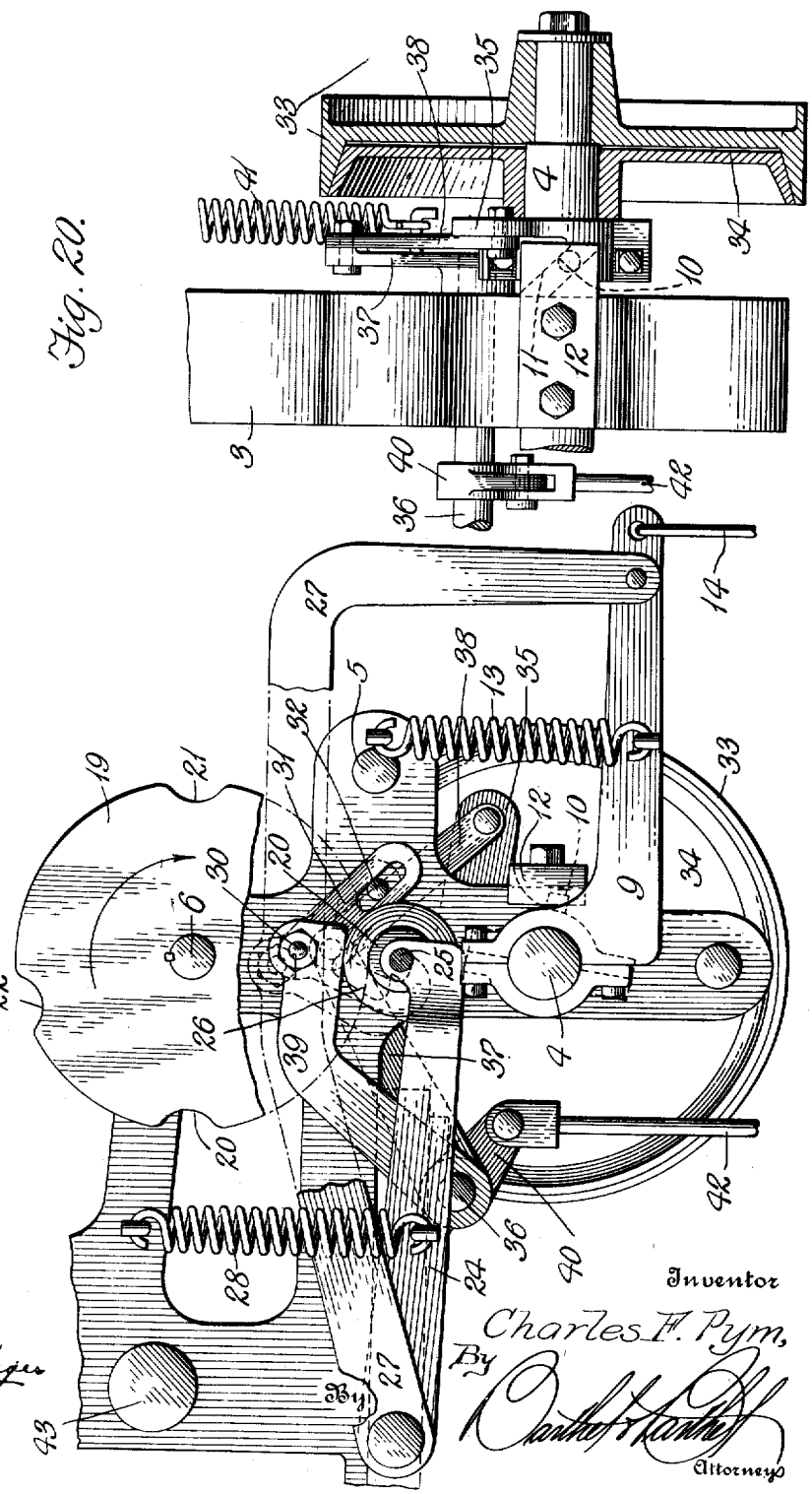

C. F. PYM.
LASTING MACHINE.
APPLICATION FILED DEC. 11, 1913.
1,274,590.
Patented Aug. 6, 1918.
16 SHEETS—SHEET 14.
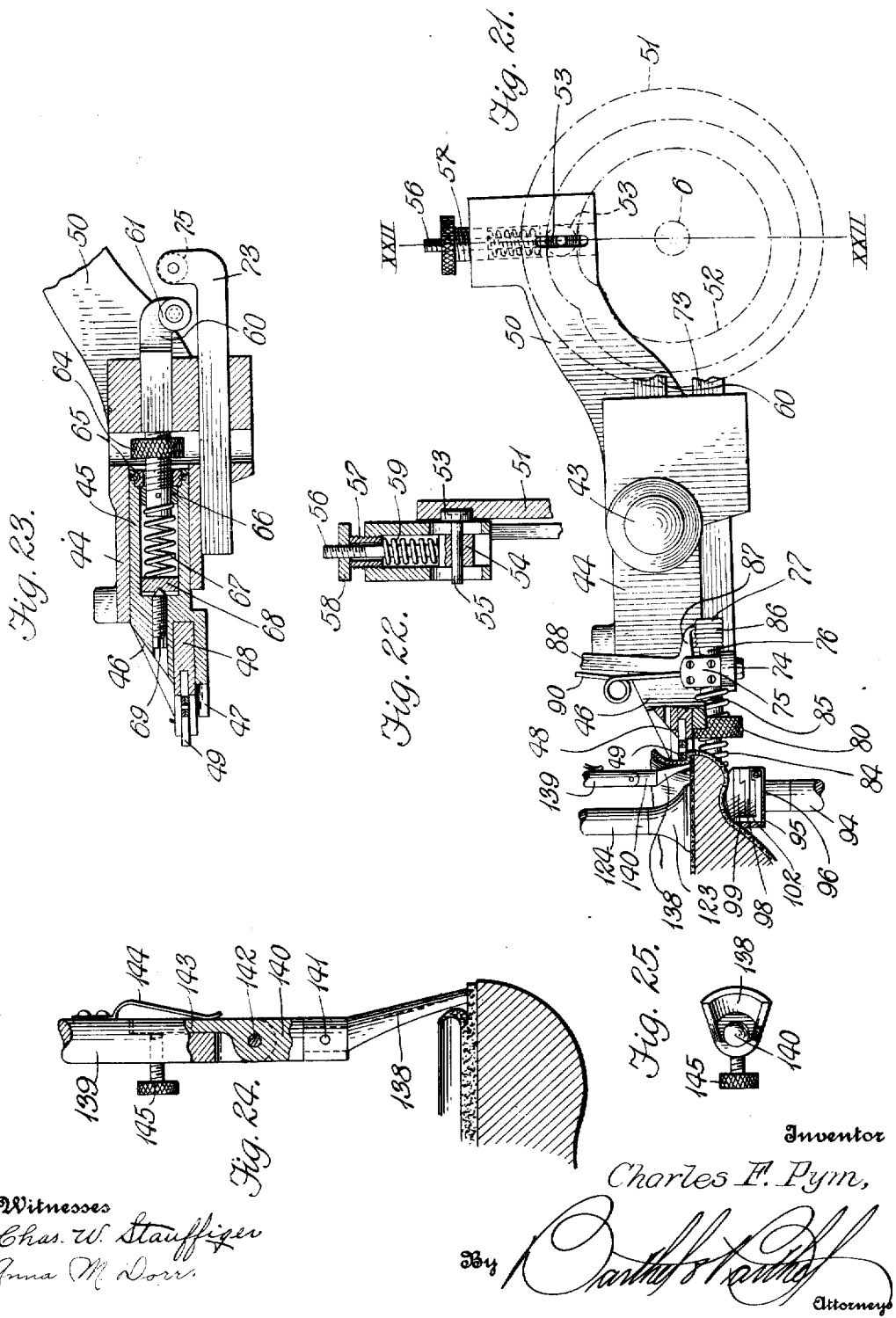

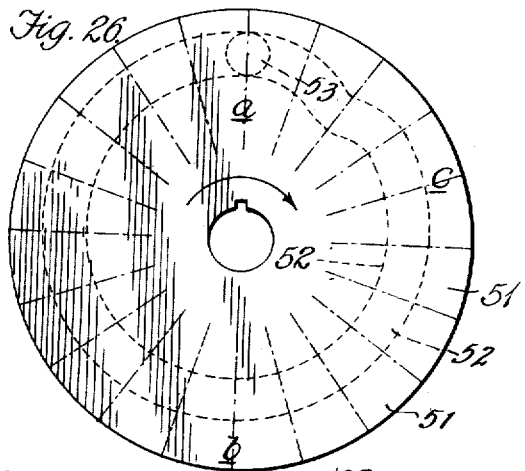
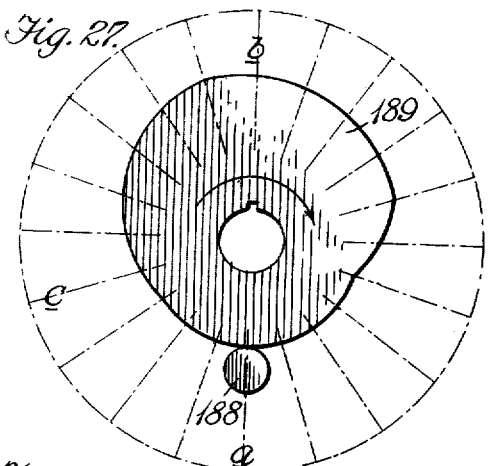
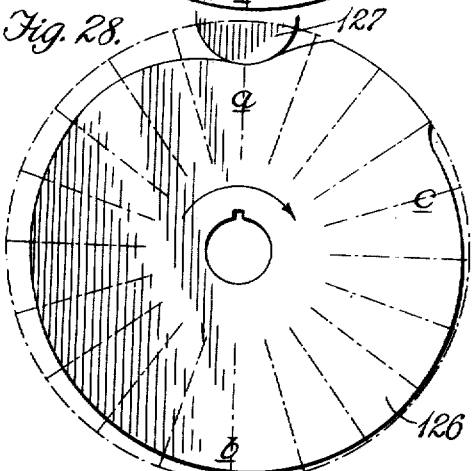
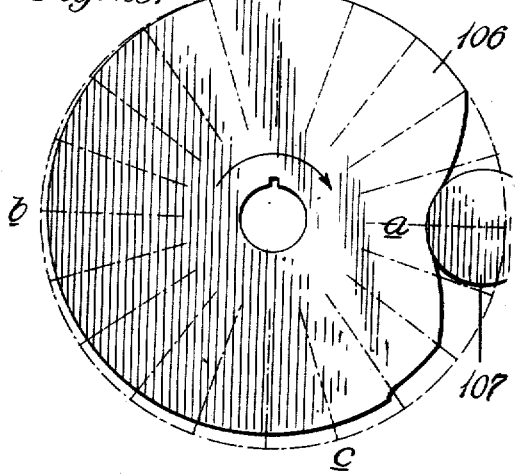
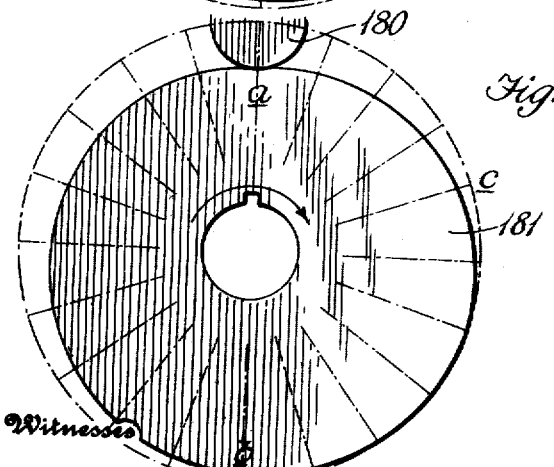

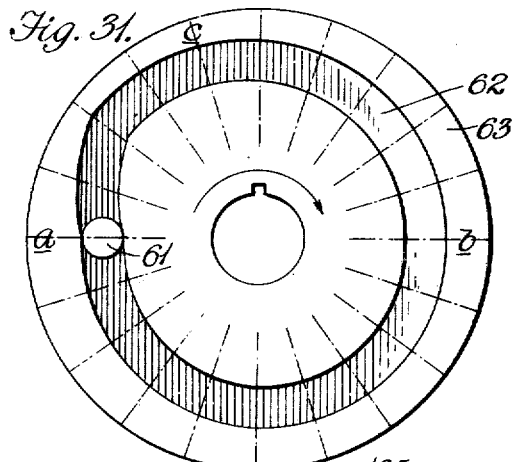
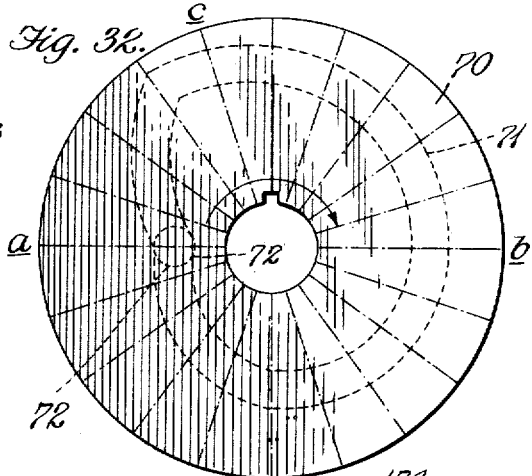
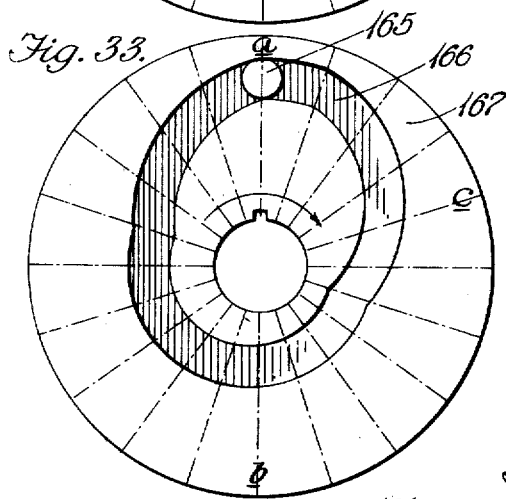
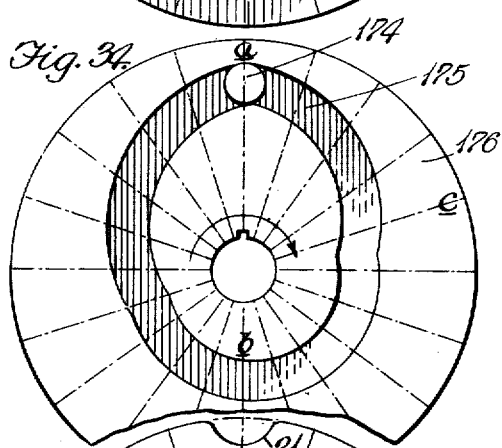
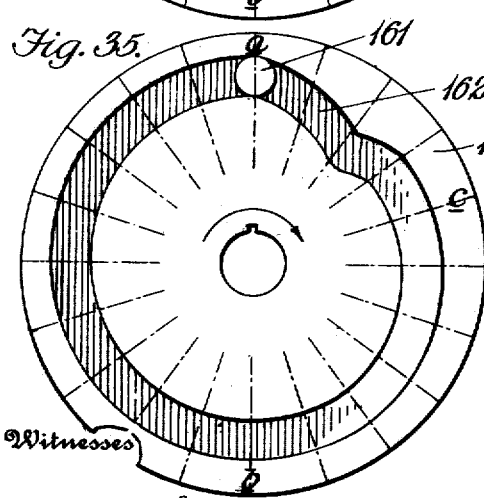
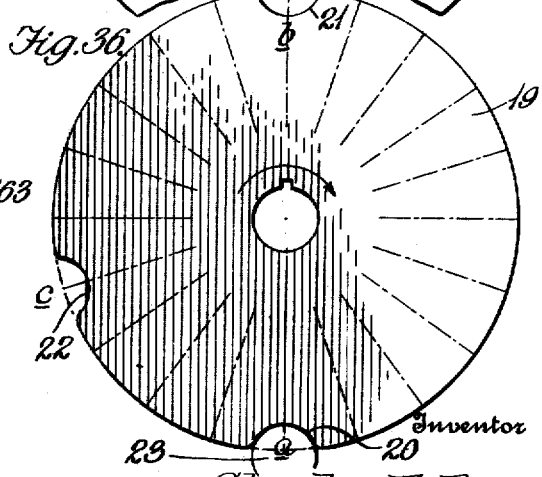
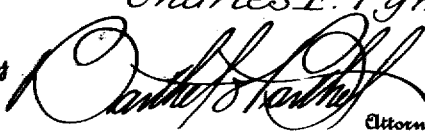

UNITED STATES PATENT OFFICE.

CHARLES F. PYM, OF ESSEX, ONTARIO, CANADA, ASSIGNOR, BY MESNE ASSIGNMENTS, TO UNITED SHOE MACHINERY CORPORATION, OF PATERSON, NEW JERSEY, A CORPORATION OF NEW JERSEY.

LASTING-MACHINE.

1,274,590.     Specification of Letters Patent.      Patented Aug. 6, 1918.

Application filed December 11, 1913. Serial No. 806,126.

*To all whom it may concern:*

Be it known that I, CHARLES F. PYM, a subject of the King of England, residing at Essex, in the county of Essex and Province of Ontario, Dominion of Canada, have invented certain new and useful Improvements in Lasting-Machines, of which the following is a specification, reference being had therein to the accompanying drawings.

This invention relates to improvements in lasting machines and more particularly to power operated machines constructed and arranged automatically to form the shoe upper to one end of the last and to wipe it down over the edge of the shoe sole.

The forming means usually employed consists of wipers arranged to be projected bodily over the bottom of the sole and coincidently to be closed over the edge of the sole. This movement of the wipers brings them into engagement with the upstanding edges of the upper materials at the end of the last and in forming these materials to the end of the last and in wiping them down over the edge of the sole, there is substantial end and side thrust against the upper and last. Unless the last and upper are firmly clamped together and supported against displacement by the end and side thrust of the wipers and against the downward pressure of the closing wipers, the upper will be shifted on the last and the lasting operation spoiled.

A feature of the invention consists in combination with means for forming the upper materials to one end of the last, of means for supporting the last and upper in position to be acted upon by said forming means and against vertical or transverse displacement, a fixed support, and an abutment member adjustable on said support longitudinally of the last into engagement with the other end of the last to hold the last against lengthwise displacement. Additionally, this abutment member is arranged for angular adjustment to a position to engage the ends of lasts of different swings.

For lasting the toe ends of shoes, the upper is firmly calmped approximately at the tip line and is supported in coöperative relation to the wipers, the last and upper being supported against vertical and lateral displacement by the advancing and closing wipers, and the end abutment engaging the heel end of the shoe preventing lengthwise displacement by the end thrust of the wipers. By these means, displacement of the tip line of the toe is prevented.

A further feature of the invention consists in combination with last and shoe supporting means and end lasting wipers, of wiper carrying means for raising and lowering the wipers relatively to the last including means to permit the wipers to yield in their downward movement toward the shoe sole, and means for so actuating said wiper carrying means. Upward movement of the wipers relatively to the last is utilized for forming the upper closely to the end of the last and for positioning the wipers in a plane to advance over the edge of the sole at which time pressure against the upper and sole substantially perpendicularly to the sole is effective to indraw and lay down the upper over the edge of the sole. This pressure should be relatively heavy in order to secure adequate compacting force but at the same time should be yielding in order to avoid displacement of the last and upper through excessive downward pressure and also to avoid damage to the upper materials or to the wipers. The described upward and downward movement of the wiper carrying means is preferably effected in timed relation to the closing movement of the wipers over the sole edge and preferably, also, by means operated independently of the means for closing the wipers.

Machines for lasting the ends of shoes, particularly the toe ends, have been provided with means, such as gripper or pincer mechanisms, for automatically stretching the shoe upper during the lasting operation. It is at times desirable and necessary to good results further to stretch the shoe upper beyond the point to which it has been stretched by the automatic operation and as part of the same lasting cycle. Accordingly, a further feature of the invention consists in combination with suitable lasting means for forming the upper materials to the end of the last, of automatic means for stretching the shoe upper during the lasting operation, and manually operable means for actuating the stretching means independently of the automatic operation. By these means the upper may be stretched sufficiently to suit the exigencies of each particular case. Additionally, and as a further feature, I have provided certain novel and advantageous gripping and stretching mechanism.

In lasting the ends of shoes, it is desirable that the wipers close over the edge of the sole a uniform distance. This is particularly advantageous in lasting the toe ends of welt shoes since the upper must be wiped into the angle between the lip and feather of the insole without injurious pressure against the lip. Obviously, too much closing movement at one or both sides of the last will break down the lip.

Accordingly, a feature of the invention consists in combination with suitable last and shoe supporting means and coöperating end lasting wipers mounted for bodily and swinging movement to embrace the end of the last and to close over the end of the sole on the last, of means to close the wipers to conform to the contour of the last end preparatory to advancing the wipers over the edge of the sole, power mechanism operable uniformly to close the wipers over the edge of the sole, with means to lock the wipers, when conformed to the contour of the last end, against further closing movement independently of the power mechanism. The wipers are yieldingly closed into conformity to the last end contour, since the contour at opposite sides will vary, and compression of the closing means, unless locking means are provided, will tend to react further to close the wipers independently of the power mechanism, when the wipers are positioned in a plane to permit an advance over the edge of the sole.

In power operated end lasting mechanism, better results can be secured in many cases by repeating a portion or portions of the lasting operation, such, for example, as repeating an upwipe of the end of the shoe thoroughly to smooth and stretch the upper into close conformity to the side of the last, or repeating the closing of the wipers over the edge of the sole to secure a better indraw and compacting of the upper. To be of parctical value, these repetitions of operating steps should be accomplished without releasing the shoe and at the option or will of the operator, since the repetition will not always be found necessary. In other words, when accomplished, they are part of the lasting cycle of the machine.

A feature of the invention consists in combination with means for forming a shoe upper to the end of its last and over the bottom of a sole on the last, of power operated mechanism for actuating said forming means, and manually controlled means for causing said mechanism to repeat a determinate portion of the forming operation.

Preferably, the power operated mechanism includes, additionally, means automatically operative to arrest the operation of the machine at a determinate point or points in the lasting cycle, to enable the operator to determine whether a repetition of a preceding portion of the lasting operation is necessary.

In the illustrated embodiment of the invention forward and reversing clutch mechanisms are employed, these mechanisms having retracting and latching connections with the automatic stop mechanism and being of novel and advantageous construction.

The upper is more closely conformed to the end, particularly the toe end, of lasts by causing relative vertical movement of the last and wipers with the wipers closed against the end of the last below the bottom of the last. A feature of the invention consists in combination with end wipers and means to support a last with its shoe upper in coöperative relation, of means for simultaneously depressing the last and raising the wipers to upwipe the upper over the end of the last.

The lifting wipers, in operating upon the toe ends of lasts, must be arranged to yield bodily lengthwise because of the contour of the toe to avoid injury to the upper materials. The lengthwise yielding movement will diminish the forming pressure of the wipers against the toe and I have found that coincident downward movement of the last and upper will exert downward pressure against the wipers which will, at the least, compensate for any loss of if any, of conforming pressure due to lengthwise bodily yield of the wipers and will provide adequate stretching and conforming pressure against the upper.

In upwiping the toe ends of lasts, the conforming and stretching updraw on the upper materials by the wipers will tend to shift the upper on the last and to displace the tip line of the toe. As an additional feature of the invention, I have provided in combination with wipers arranged for vertical upwiping movement, means to clamp and support a last and upper in coöperative relation to the wipers with the sole above the plane of the wipers, and means to move the wipers upwardly to upwipe the upper and coincidently to move the last downwardly to coöperate in the upwiping movement and to increase the clamping pressure against the upper and last.

This result is accomplished in the illustrative embodiment by clamping the last and upper between a toe support and an opposed clamping member, the toe support being tensioned upwardly and yielding downwardly with the last, when the opposed clamping member is moved downwardly, the spring of the toe support being thereby further tensioned to increase the clamping pressure of the toe support against the upper at or adjacent to the tip line to prevent displacement of the tip line and the downward movement of the last providing additional upper conforming and stretching pressure between the wipers and last end.

These and other features including novel constructions of wiper head and last supporting jack are more fully described in the following detailed specification and are illustrated in the accompanying drawings in which:—

Figure 1 is a side elevation of a machine embodying the invention;

Fig. 2 is a plan view of the same;

Fig. 3 is a vertical section, substantially on the line III—III of Fig. 2 and showing the parts in a different position from that in which they are shown in Fig. 1;

Fig. 4 is a central vertical section substantially on the line IV—IV of Fig. 2 and showing the parts in a third position of the lasting operation;

Fig. 4ª is a sectional detail view on the line IVª of Fig. 4;

Fig. 5 is a horizontal sectional view substantially on the line V—V of Fig. 3;

Fig. 6 is an enlarged detail view showing the pincers and their operating levers in plan view, partly broken away and partly in section;

Fig. 7 is a similar detail view illustrating the manner in which the pincers are operated by hand, independently of their automatic operation;

Fig. 8 is a perspective view of a toe rest;

Fig. 9 is an enlarged detail view showing the pincers in front elevation with a shoe upper engaged thereby and illustrating the manner in which the upper may be manually stretched and spread, independently of the automatic operation of the machine;

Fig. 10 is a detail view showing a vertical section through a pincer adapted for use at the end of a last;

Fig. 11 is a side elevation of a side pincer;

Fig. 12 is a horizontal sectional view of the same on the line XII of Fig. 11;

Fig. 13 is a view similar to Fig. 11 illustrating the operation of a hand lever in closing the pincer jaws to grip a shoe upper;

Fig. 14 is an enlarged detail view of a yieldable connection for actuating wipers to close the same, showing parts in section and locking means therefor;

Fig. 15 is a transverse sectional view of the same, substantially on the line XV of Fig. 14;

Fig. 16 is a side elevation of stop and repeating mechanism;

Fig. 17 is a similar view of the same with parts broken away to further show the construction;

Fig. 18 is a transverse section through the parts of said mechanism which are located at the right hand side of the machine;

Fig. 19 is a detail view similar to Figs. 14 and 15, with parts broken away to show the construction and showing the parts in the position in which they appear when actuated to reverse the operation of the machine;

Fig. 20 is a sectional detail view of the portion of said mechanism which is located at the left hand side of the machine;

Fig. 21 is a detail of a rocker head for carrying the wipers and adjacent parts illustrating the operation of a yieldable connection between the tail thereof and its cam;

Fig. 22 is a transverse sectional view of the same substantially on the line XXII of Fig. 21;

Fig. 23 is a longitudinal sectional view through the rocker head showing means for securing a yielding forward bodily movement of the wipers;

Fig. 24 is a sectional detail view of a toe presser or insole control;

Fig. 25 is a bottom end view of a foot for said toe presser;

Figs. 26 to 35 inclusive are detail views of the several operating cams; and

Fig. 36 is a detail view of a stop wheel.

As shown in the drawings, 1 indicates a suitable supporting pedestal having a plate or table 2 upon which two like bearing brackets or frames 3 are secured, said frames being provided with bearings for a transverse drive shaft 4, a counter shaft 5 and a cam shaft 6. Mounted upon one end of the drive shaft to turn freely thereon is a belt pulley 7 having an internal clutch face adapted to be engaged by a cone clutch wheel 8 (Fig. 18) mounted upon the drive shaft to slide longitudinally thereon and operatively connected thereto to turn therewith.

To slide the cone 8 into frictional contact with the driving pulley 7 so that motion will be transmitted from said pulley to the shaft, a lever 9 is mounted upon the shaft in contact with the end of the hub of the cone to turn freely thereon, the lever being extended rearwardly from the shaft, and on this lever is a pin 10 (see Figs. 16 to 19 inclusive) projecting into a slot 11 in the end of a fixed bar 12 secured to the machine frame or other suitable support, said slot being inclined in the direction of the length of the drive shaft so that upon a rotation of the lever, the pin will be carried down the slot and force the lever and cone along the shaft toward the pulley. A spring 13 connected to the lever 9 at one end is attached at its opposite end to the frame or other fixed support and acts to normally hold the lever raised and the cone out of contact with the pulley. By means of a rod 14 attached to the free end of the lever, said lever may be turned to throw the clutch into operation, said rod being connected to a treadle or other suitable operating means, (not shown).

Motion is transmitted from the driving shaft 4 to the cam shaft 6 by means of a pinion 15, Fig. 5, on the drive shaft in engagement with a large gear 16 on the counter shaft 5, and a pinion 17 on the counter shaft in engagement with a large gear 18 on the cam shaft. The cam shaft is thus given a slow rotary motion to actuate the several lasting devices. Secured upon one end of this shaft is a stop cam or wheel 19 adapted to stop the operation of the machine with its parts in certain pre-determined positions or at certain stages of the lasting operation, this wheel being provided with notches 20, 21 and 22 in its periphery adapted to be engaged by a roller 23 mounted within the forked end of a lever 24 pivoted at its forward end to the machine frame (Fig. 16). This roller 23 turns upon a shaft or pin 25 secured in bearings in the fork and mounted to turn freely upon the outer ends of this pin are anti-friction rolls 26, one at each side of the lever (Fig. 18). The roller 26 at the outer side of the lever is engaged by a bar 27 which extends thereover and is pivoted at its forward end to the machine frame, turning upon the same pivot as the lever 24, and at its rear end, this bar is turned downwardly and pivotally connected to the lever 9 to be swung downwardly thereby when the lever is actuated to throw in the friction clutch. The bar 27 thus operates to depress the forked lever 24 against the action of a coiled spring 28 connected to the frame and lever and exerting power to normally hold the lever raised with its stop roll 23 in contact with the stop wheel 19, and release the wheel simultaneously with the operation of the clutch to set the machine in motion.

A swinging of the lever 9 by a pull on the rod 14 thus sets the machine in motion and as the roll 23 is then riding upon the periphery of the wheel 19, the machine will not be stopped thereby until said roll drops into the next notch or the clutch is released, and to obviate the necessity of the operator holding the clutch in, as by keeping his foot on the treadle which operates the rod 14, a latch member 29 is pivoted at 30 to the bar 27 and has a hooked lower end to engage beneath the projecting outer end of the pin 25 on which the roll 23 is mounted. This latch serves to lock said bar and the lever 24 together and prevents the upward turning of the lever 9 and the release of the clutch until the roll 23 drops into a notch in the wheel and permits the upward swinging of the lever and bar, simultaneously stopping the machine.

To swing the hooked end of the latch 29 into engagement with the pin 25 when the bar 27 is swung downwardly by the lever 9 and to swing it out of engagement therewith when the bar is permitted to rise by the entrance of the stop roll into a notch of the stop wheel, said latch is provided with a laterally and downwardly extending tail piece or arm 31 provided with a longitudinal slot through which a fixed pin 32 on the machine frame extends. As the pin 32 is out of the vertical plane of the axis of the pivot 30, when the bar 27 is lowered, the latch will be turned upon said pivot to bring its hook beneath the pin 25 and the upward movement of the bar, when roll 23 enters one of the notches 20—21—22, will cause a reverse movement of the latch to disconnect the bar from the lever. When the lever 9 is actuated, the machine is therefore set in motion and will continue to operate until the stop roll drops into a notch of the stop wheel, when the operation will be automatically stopped, the machine being thus automatically stopped in three different positions during the lasting operation, by the notches 20, 21 and 22. If found desirable the operator may cause the machine to operate continuously by simply holding the lever 9 turned downwardly.

It has been found to be desirable to repeat portions of the lasting operation and for this purpose means has been provided for reversing the motion at the end of any period of operation or when the machine is automatically stopped. The reversing means comprises a reversing clutch consisting of a pulley 33 (Figs. 2, 5, 19 and 20) similar to the pulley 7 driven in a direction opposite thereto and mounted loosely upon the opposite or left hand end of the drive shaft, a cone member 34 keyed to the drive shaft 4, and a lever 35 for moving the cone into contact with the pulley, said lever being provided with a pin 10 engaging a slot 11 in a bar 12 which are constructed and arranged to operate the same as the like indicated parts previously described. A rock shaft 36 (Fig. 19) is mounted in suitable bearings on the table 2, extending across the machine and on the left hand end of this shaft is an arm 37 connected to the outer end of the lever 35 by a link 38. Upon the opposite or right hand end of the shaft 36 is secured an arm 39 over-riding the roll 26 on the inner end of the pin 25 and pivotally attached to the end of this arm is a latch member which is a duplicate of the member 29 on the bar 27 and is arranged to engage the inner end of the pin 25 and to be operated by the pin 32 passing through the slot in its tail piece. A crank arm 40 is secured to the rock shaft 36 near its left hand end for turning said shaft against the action of a coiled spring 41 (see Fig. 20) attached to the arm 37 or other convenient part, and a rod 42 is pivotally attached to the end of said arm 40 for turning the shaft by means of a treadle or other means (not shown).

When the machine is at rest, by turning the rock shaft 36, the reversing clutch 34 is thrown in and the stop roll 23 is simultaneously disengaged from a notch of the stop wheel by the arm 39, and this arm is locked to the lever 24 by the latch so that the clutch will be held in, as long as the stop roll is riding upon the periphery of the disk. The machine may thus be turned backward during a period of its operation represented by the distance between the notches 20 and 21, and between the notches 21 and 22, of the stop wheel.

The bearing frames 3 are provided with bearings for the laterally extending trunnions 43 of a rocker head 44 which is bored longitudinally to receive the tubular stem 45 (see Figs. 4 and 23) of a wiper head 46 having laterally and forwardly extending flanges 47 forming between them a transverse horizontally extending and forwardly open slot to receive wiper carrying plates 48 which are likewise formed with a slot in their forward edge to receive wiper plates 49. These wiper plates are pivotally connected and provided with formed forward edges in the usual manner, to engage the heel or toe portion, and in the present showing, the toe portion of the upper of a boot or shoe upon a last.

The rocker 44 is rocked upon its trunnions by means of a tail piece or arm 50 extending rearwardly therefrom and a cam 51 on the cam shaft 6 provided with a cam groove 52 to receive a roll 53 carried by the rear end of said tail piece. An enlargement on the rear end of said tail piece (Figs. 21 and 22) is bored vertically to receive a slide 54 in which a bearing pin 55 is fixed, said pin forming a journal for said roll which is mounted on an end of said pin projecting outwardly through a slot in the side of the bore. A reduced end or stem 56 on the slide extends upwardly through an axial guide opening in an adjustable plug 57 which is screwed into the upper end of the bore, and the outer end of the stem is screw threaded for the engagement of an adjusting nut 58 which rests upon the outer end of the plug. A coiled spring 59 is sleeved upon the stem between the slide and the inner end of the plug to normally hold the slide moved downwardly in its bore to the limit of its movement, which limit and the tension of the spring 59 is determined by the adjustment of the nut 58.

The wiper head 46 is given a reciprocatory movement upon the rocker to bring the wiper plates into contact with the shoe upper and to advance them over the edge of the shoe sole upon the last, by means of a bar 60 having a roll 61 on its rear end to engage in a cam groove 62 in a cam disk 63 on the shaft 6 (Fig. 4). The stem 45 of the head is bored longitudinally inward from its rear end to receive the forward end of the bar 60, which end is screw threaded for the engagement of an adjusting nut 64 therewith, said bar being formed rectangular in cross section at its rear end portion to fit within a suitable guide opening in the rocker 44 and slide freely therein, said bar being thus prevented from turning.

A ring 65 is secured in the rear end of the bore of said stem to be engaged at one side by the nut 64 and at its opposite side by a collar 66 secured on the forward end of the bar. This bar is thus connected to the stem of the head to reciprocate said stem in its bearing in the rocker, the bar being adapted to slide through the ring 65 when the nut 64 is adjusted so that the space between it and the collar 66 is greater than the width of the ring. To normally hold the bar and said stem moved relatively with the collar 66 in contact with the inner end of the stop ring 65, a coiled spring 67 is placed in the bore of the stem between the collar and a follower block 68 which is adjusted longitudinally of the bore to put a tension on the spring, by an adjusting screw 69 engaging a screw threaded opening in the head extending through the forward end thereof in the axial line of the bore.

When the push bar is thrust forwardly by its cam, if the resistance offered by the work to the forward movement of the head is not sufficient to compress the spring 67 or if the nut 64 is so adjusted as to prevent any movement of the bar through the stop ring, said bar and head will be moved together, but if such resistance is greater than the resistance of the spring, the spring will yield slightly thus providing a limited, adjustable, yielding, forward movement of the wipers to provide for any variation in the thickness of the leather stock or the size or shape of the ends of lasts. The arrangement also permits of a slight rearward yielding movement of the wipers as they wipe upward in contact with the toe portion of a shoe on a last, to provide for the slanting form of the end thereof.

To close the pivotally connected wiper plates into contact with or over the end of a last, in timed relation to their forward movement, a wiper closing cam disk 70 on the cam shaft 6 has a cam slot 71 engaged by a roll 72 on the rear end of a bar 73 which is mounted within a guide opening in the rocker head directly below the bar 60. The forward end of this bar 73 is pivotally attached to an equalizing bar 74 (Figs. 4, 5 and 14). Extending through an opening in each end of said bar is the shank of an eyebolt 75 adapted to turn freely in the openings about a vertical axis, the eye of each bolt being adapted to receive a rod 76 slidable therethrough upon its horizontally disposed longitudinal axis, said rods being each provided with a head 77 to engage one side of the head of the eye-bolt through which the rods extend. Each portion of the rod adjacent to its head 77 and forwardly of its eyebolt 75 is reduced in diameter, forming a shoulder 78 adapted to be engaged by an externally screw threaded collar 79 slidable on the rod and engaged by an internally screw threaded sleeve member 80 adapted to be adjusted upon the collar to change their combined effective length by turning the block and sleeves relatively. The forward end of each rod is screw threaded to engage the screw threaded eye-bolt 81 having a shank extending vertically upward through an opening in a laterally extending ear 82 on each wiper carrying plate 48 to turn freely therein, said eye-bolts thus forming universal connections for the ends of the rods with the carrying plates and equalizing bar. Sleeved upon the reduced portion of each of said rods between the collar 79 and an adjusting nut 83, is a coiled spring 84 acting to normally hold the collar against the shoulder 78, and a lighter coiled spring 85 is sleeved on the rod between the member 80 and the adjacent side of the eye-bolt 75.

As the eye-bolts 75 are slidable on the rods 76 against the action of the springs 84 and 85, the wiper plates are yieldingly closed upon the work, the lighter of the springs 85 yielding first and upon further movement, the heavier springs 84 being compressed. The strength of each spring 84 is adjusted by the nut 83 and that of each spring 85 by means of the sleeve 80. any desired yielding contact of the wiper plates with the shoe upper being thus secured.

When the wipers are advanced by the cam 63 and then moved relatively to the last to wipe the shoe upper up and against the end of the last, the springs 84 and 85 will be more or less compressed when in position to be advanced over the edges of the shoe sole and form the upper down thereon, and if the work does not offer sufficient resistance to prevent the springs from acting to close the wipers, they may be projected thereby over the shoe sole beyond the position to which they are positively moved by the instrumentality of the cam 63. In lasting welt shoes it is desirable to prevent overwiping, that is, an advancing and closing of the wipers beyond the shoulder presented by the sewing lip of the insole. If the wipers ride over the lip they are liable to press it down or deform it so as to render it less satisfactory to sew to in the welt attaching operation. Overwiping by reason of the action of the springs 84, 85 may be avoided, for instance, as shown in the illustrative embodiment, by locking the springs 84, 85 against expansion during the overwiping operation, thereby leaving the wipers, during the overwiping operation, entirely under the control of the cams 63, 70 from which they will be given a predetermined overwiping movement inwardly from the variable position which they assume at the edge of the shoe, this variable position being determined with accuracy by the shape of the toe of the shoe. To prevent the wipers from being closed by the action of these springs during their movement over the edge of the sole, the heads 77 on the rear ends of the rods 76 are each formed with a series of annular grooves forming ratchet teeth 86 for the engagement of pawls or dogs 87 pivotally attached to the eye-bolts 75 and each having a long upwardly extending lever arm 88 adapted to contact with an adjustable stop 89 (see Figs. 1 and 3) on the machine frame or bearing brackets 3 to lift the dogs out of engagement with the teeth 86 when the wiper head approaches the limit of its rearward movement, a spring 90 being provided for each dog to turn the same into engagement with the teeth, upon forward movement of the wipers.

When either or both of the springs 84 and 85 are compressed during the wiping-up operation of the wipers, the rods 76 will slide through the eye-bolts 75 and the dogs 87 will, by their engagement with the teeth of the heads on said rods, prevent the expansion of the springs. When the wiper plates therefore are in position to be forced forwardly and closed over the edge of the shoe sole to form the upper down thereon, they will be advanced just a certain distance by the cam 63 and simultaneously closed a predetermined amount by the cam 70 thus obviating possibility of injury to the lip of the shoe sole by the closing in of the wiper plates too far.

To support a last with a shoe thereon in position for lasting, a suitable bracket 91 is bolted to the forward edge of the table 2, said bracket being formed with a vertical guide way 92, (Fig. 4ª) for a slide 93 provided with bearings for the vertical post 94 of a jack which comprises said post and a head 95 on the post forming a seat for the toe portion of the last. The head is formed of a fixed base member 96 on the post having an undercut groove in its upper face extending forwardly and rearwardly of the machine to receive a rib 97 on the lower side of an intermediate block 98 having a like groove in its upper side extending transversely of the machine at right angles to the groove in the base and arranged to receive an undercut rib 99 on an upper block or member 100 having a suitably formed pad 101 of rubber or other suitable material secured upon the upper side thereof upon which the shoe toe is adapted to rest. Flat springs 102 are secured at one end to the sides of the base member with their free ends in contact with the slidable members 98 and 100 to yieldingly hold said members in vertical alinement. The construction of the head permits of a slight lateral or longitudinal adjustment of the last without moving the shoe upper in contact with the support, thus obviating the liability of injuring the surface of the leather when it rests upon the head of the jack. The slide 93 which carries the post 94 is provided with an upper bearing through which the post slides freely and a lower bearing in which is an exteriorly screw threaded adjustable sleeve 103 forming a seat for a coiled spring 104 sleeved upon the post between said sleeve and a collar 105 on the post which is thus yieldingly supported on the slide.

The jack is automatically raised in timed relation to the movements of the wipers and other parts of the machine, by a cam wheel 106 on the cam shaft 6, having a formed periphery engaged by a roller 107 on the rear end of the rocker arm 108 which is pivoted intermediate its ends to the frame and connected at its forward end to the slide 93 by a link 109.

The heel portion of the last is adjustably supported upon a carriage 110 which is mounted to slide freely upon a track 111 carried by a swinging platform 112 movable upon a curved guide or track 113, the axis of curvature of which is coincident with the longitudinal vertical axis of the jack post 94 so that by shifting the platform, the heel portion of the last will be swung about the toe portion to provide for lasts of different swings, or rights and lefts. Upon the carriage 110 is a spindle 114 pivoted to turn upon a horizontal transverse pivot 115 and on this spindle is a cap 116 internally screw threaded for longitudinal adjustment and provided with a stud to engage the usual opening in the last. Adjacent to and forwardly of the spindle is a rigid vertical member 117 formed at its forward side to engage the heel end of the last and form a rest therefor. The carriage is moved along its track and held in the position to which it is moved by means of a pinion 118 on a transverse shaft 119 mounted in bearings on the carriage and engaging a rack bar 120 on the platform, the outer end of said shaft being provided with a ratchet wheel 121 engaged by a dog 122 pivotally mounted on the carriage. After the toe portion of the last has been properly positioned and clamped in place upon the jack, as will be hereinafter described, the platform being swung upon its track 113 to properly aline the last, the heel rest 117 is brought into contact with the heel of the last to take the thrust of the wipers against the toe portion, and thus a very rigid support is provided for the last.

The last is clamped in position for lasting upon the jack by means of a hold-down 123 adapted to engage the shoe sole on the last at a short distance from the toe portion thereof and is carried by the lower end of a vertical post 124 slidable in a guide bearing on a U-shaped bracket 125 secured at its ends to the forward sides of the bearing brackets 3. To raise and lower the hold-down in timed relation to the movement of the jack, a hold-down cam 126 is secured to the cam shaft 6 and a roll 127 is provided on the rear end of the tail piece or arm 128 of a U-shaped rocker frame mounted to turn upon a shaft 129 having bearings on the upper ends of the brackets 3, the forwardly extending side arms 130 of said frame being spaced apart at their forward ends to receive between them a yoke 131. This yoke is formed with horizontally disposed slots in its ends to receive pins 132 on the said ends of said side arms, and intermediate its ends, the yoke is provided with a screw threaded opening to receive an adjusting sleeve 133 through which a reduced end of the post 124 extends. The reduction in the diameter of the upper end of the post forms a shoulder 134 on the post to engage the lower end of the sleeve and a nut 135 on the screw threaded upper end of this reduced end engages the upper end of the sleeve and holds the post therein, at the same time clamping the sleeve to prevent its turning upon the post, said post being held against turning in its guide bearing in the bracket 125 and free to slide therein by forming a longitudinal groove 136 in the post to be engaged by a pin or other key 137 on the bracket guide.

In wiping the shoe upper up around the toe of the last and forming it over and down upon the edge of the shoe sole, the wiper plates are liable to displace the edge of the shoe sole, wiping it up and turning it inwardly away from the edge of the last at the point of the toe, and to prevent such displacement, an insole controlling or toe presser member 138 is provided, said member being attached to the lower end of a rod 139 extending upwardly through an opening in the bracket 125 which forms a support and guide therefor, by a lower pivoted end portion 140 having a reduced end to engage a socket therefor in the toe member. A pin 141 (Fig. 24) detachably secures the member in place, and the end portion 140 of the rod which is pivoted at 142 to the split or forked lower end of the rod, has an upwardly extending tail portion 143 within said fork, engaged by a spring 144 to normally hold said tail in contact with a set screw 145 engaging a screw threaded opening in the opposite side of the rod. By means of this set screw, the toe member 138 may be turned on the pivot 142 to adjust the same so that it will engage the particular shoe being lasted just outside the lip of its insole. Should the wipers by any chance press against the toe presser in their forward wiping movement, the spring 144 will yield, permitting the presser to turn sufficiently to prevent breakage.

The toe presser 138 is raised and lowered in timed relation to the movements of the jack and hold-down by means of a rocker frame 177 pivotally mounted to turn upon the shaft 129 between the sides of the presser frame 130, the forward ends of the side members of said rocker being spaced apart to receive between them a yoke 178 similar to the yoke 131 of the hold-down. The upper end of the rod 140 is adjustably attached to said yoke and the yoke to said frame in the same manner in which the post 124 is connected to the frame 130 (the attaching parts being similarly numbered), and the rearwardly extending tail or arm 179, of which frame 177 is provided with a roller 180 on its rear end to engage the formed periphery of a cam wheel 181 on cam shaft 6.

To stretch and pull the shoe upper up around the last during the lasting operation, a series of pincers are provided, preferably comprising a side pincer 146 at each side or corner of the toe portion of the last and an end pincer 147 directly opposite the end of the toe of the last, but it will be understood that any desired number of pincers may be employed and operated in a manner substantially as hereinafter described. The pincers each comprise a hollow or slotted head 148 having a lower pincer jaw 149 formed integral therewith and curved forwardly and downwardly from the lower end thereof, and a carrying stem 150 is formed integral with the upper end of the head adjacent to the formed edge thereof. A pivoted jaw 151 has an extended shank portion projecting into the open front side of the head and is adapted to be swung outwardly and downwardly to bring its lower end in opposition to the gripping portion of the fixed jaw. This pivoted jaw is carried by a short link 152 pivotally attached to the end of its shank portion at one end and at its opposite end to the walls of the head 148, and is also carried and swung by a lever 153 pivoted to the walls of the head intermediate its ends and at its forward end to the jaw midway between the gripping end thereof and the end to which the link is attached. The opposite or rear end of the lever 153 is slotted longitudinally to receive a roller stud 154 carried within the forked lower end of a rod 155 which extends upwardly through the upper end of the head and is adapted to be lifted vertically to close the movable jaw toward the fixed jaw and grip the upstanding edge of the shoe upper therebetween. This pincer or gripper mechanism forms the subject-matter of a divisional application, filed May 21, 1918, Serial No. 235,820.

The center or end pincer 147 is carried by a frame 156 (which also supports the side or "corner" pincers) having an opening at its forward end through which the stem 150 extends, said stem being provided with a collar 157 to engage the upper side of the frame and hold the stem within said opening. An opening is also provided in the frame for the rod 155 which passes freely therethrough and upwardly through an elongated opening in the end of a pincer closing arm 158 with said end supported at a distance above the frame. Said frame and arm are both pivotally supported by a shaft 159 mounted in bearings on the bearing brackets 3 to the rear of the shaft 129 and below the horizontal plane thereof, and the frame is rocked on said shaft to raise and lower the pincers in timed relation to the movement of the wipers, by means of a rearwardly extending arm 160 or tail piece on the frame having a roll 161 at its rear end to engage a cam groove 162 in a cam disk 163. The arm 158 is likewise rocked to lift the rod 155 and close the jaws of the center pincer in timed relation to the movement of the wipers, by means of a rearwardly extending tail or arm 164 provided with a roll 165 on its rear end to engage a cam groove 166 in a cam disk 167. The rod 155 is yieldingly connected to the arm 158 by sleeving a coiled spring 168 on the rod between a washer 169 thereon in contact with the upper side of the arm, and a flange at the upper end of a sleeve 170 having screw threaded engagement with the rod (Fig. 10). When the arm 158 is lifted relatively to the carrier frame 156, the rod is raised by the spring until the jaws close upon the edge of the shoe upper and then further movement of the arm will compress the spring, thereby yieldingly closing the jaws upon the work.

The two side or corner pincers 146 are in a like manner closed by means of closing levers or arms 171 also pivoted to turn upon the shaft 159, said lever arms being connected to turn together by means of a connecting bar 172 and rocked to raise and lower the arms and close the pincer jaws by a tail or arm 173 thereon extending rearwardly and provided with a roll 174 to engage a cam groove 175 in a cam disk 176 on the cam shaft 6. The rod 155 of each side pincer is yieldingly connected to its arm 171 in the same manner as that in which the closing rod of the center pincer is attached to the center pincer closing lever 158 so that the jaws will yieldingly grip the work.

Instead of being directly mounted upon the pincer carrier 156, the side pincers 146 are carried by swinging plates 182 (Fig. 7)

each pivotally attached at 183 to the carrier 156 and resting upon the upper side thereof. The stem 150 of the head of each side pincer, passes up through an opening in the plate 182 at a distance forwardly of the pivot 183 so that when said plates 182 are swung by means of connecting rods 184 pivotally attached to outwardly extending ears 185 on the outer ends of the plates, the pincers will be moved toward or from the sides of the last. The rods are adjustable in length to give the proper adjustment to the plates by providing each rod with a coupling sleeve 186 and the rear end of each rod is pivotally connected to the upper end of a bell crank or bent lever 187, said levers being pivoted intermediate their ends with their rearwardly extending arms each provided with a roll 188 yieldingly held in engagement with the formed periphery of pincer spreader cams 189 on the cam shaft 6. The side pincers are thus automatically swung away from the sides of the last in timed relation to their other movements to pull and stretch the shoe upper during the operation of the wipers.

Each carrier plate 182 is provided with two slots 190 and 191 curved concentrically with the axis of the stem of the pincer head carried thereby, the slot 190 being provided for the pincer closing rods 155 of said pincers which extend upward freely therethrough and the slot 191 being provided to receive the upper end of a supporting stud 192 adjustably secured therein by means of a nut 193 on its screw threaded upper end. These slots permit of the angular adjustment of the side pincers about the axes of the stems 150 and relatively to their plates 182. The lower end of each stud forms a bearing for the pivotal attachment thereto of an operating handle 194 which is connected to the pincer closing rod 155 of the adjacent pincers, by means of a transverse pin 195 in the rod projecting through slots 196 in the side wall of the pincer head and engaged at its ends in longitudinal slots 197 in the sides of the forked end of said hand lever which fork embraces the head. The jaws of each side pincer may thus be manually closed by means of the hand levers 194, as by a downward pressure on the handles, the rods 155 are lifted, and if desired, the pincers may be bodily lifted, after having been closed by the handles, by a further movement of said handles, the stem 150 and rods 155 sliding upwardly through their openings in the carrier plates 182. A coiled spring 198 sleeved on each stem between the head and plate, resists the bodily upward movement of the pincers, and to cause the lifting power of each handle to be evenly distributed and applied to its pincer head, equalizing bars 199 are pivotally attached at 200 intermediate their ends to the sides of the forked end of the handle between said sides and head to engage lugs 201 on the head in the transverse vertical plane of the stem. Adjacent to its opposite end said bar is formed with a longitudinal slot 202 (Fig. 12) through which the pin 195 projects and thus when the handle is operated to raise the rod 155 and close the jaws, the forward ends of the bars will engage the lugs 201 and power will thus be transmitted from the handle through the pivots 200 to the bar and from said bar equally to said lugs and to the rod 155 through the medium of said pin 195 giving a direct even lift on the pincer heads and relieving the link connection between said rod and the movable jaws from heavy strains which would otherwise be put upon said connection upon the operation of the handle to raise the head bodily and stretch the shoe upper manually beyond the point to which it is drawn by the automatic lift of the pincers in addition to updrawing the gripped upper, the handles may be pressed backwardly while being pulled downwardly, swinging the plates 182 on their pivots to spread and stretch the upper laterally.

When the machine is in an open position to receive a last with a boot or shoe in place thereon for lasting, as shown in Fig. 1, the jack is at the extreme lower end of its movement, the roller 107 being in contact with the innermost run of the jack cam, as shown in Fig. 29; the presser foot 123 is raised to the limit of its movement, the roller 127 being in contact with the innermost portion of the cam surface of the cam 126, as shown in Fig. 28; the toe presser finger 138 is also fully raised, the roller 180 engaging the inner portion of the cam surface of the cam 181, as shown in Fig. 30; the pincer carrying member 156 is rocked downwardly, as are also the pincer closing arms 158 and 171, to lower the pincers and fully open the jaws, the roll 161 being in the outer portion of the groove of cam 163 to lower the pincers as shown in Fig. 35, and the rolls 165 and 174 being in the outer portions of their cam grooves in the cams 167 and 176 respectively, as shown in Figs. 33 and 34; the carrier plates for the side pincers are turned toward each other to bring the side pincers adjacent to the sides of the last where the upper may be readily placed between their open jaws, the rolls 188 being in contact with the inner concentric portion of the surface of the pincer spreading cams 189; the wipers are retracted by roll 61, which is in the innermost part of its cam slot in the wiper forward cam 63, and are opened outwardly to their fullest extent by the roll 72 which is at the innermost point of its cam groove in the wiper closing cam 70; said wipers being at the same time held in lowered position by the rocker head 44 which has been rocked by the engagement of the roll 53 with the outermost portion of its groove in the rocker cam 51; and the heel supporting carriage 110 is moved forwardly away from the jack as shown in Fig. 1, to permit of the ready engagement of a last with a shoe thereon with the supporting spindle 114 and the placing of the upstanding edge of the shoe upper between the open jaws of the pincers. This open position of the machine is indicated by the letter a upon the several cams, Figs. 26 to 35 inclusive, and also upon the stop wheel 19, Fig. 36, the stop roll 23 being engaged with the notch 20.

The machine being at rest with the parts in the positions above described, the operator may quickly and accurately position a last with a shoe thereon for lasting by placing it upon the heel spindle 114 with the upstanding edge of the shoe upper between the jaws of the several pincers and may swing the heel supporting platform laterally upon its track 113 to bring the last in proper relation with the wiper plates according to whether the last is a right or left. He then starts the machine by actuating the rod 14 to throw in the clutch 8, immediately thereafter moving the heel member 117 into engagement with the heel of the last where it is locked by the dog 122. The jack is at once raised to the limit of its upward movement by its cam 106 when the machine is started and the hold-down 123 is simultaneously lowered by its cam 126 to clamp the last between said jack and hold-down, the center and side pincer closing cams also acting to close the pincers upon the edge of the shoe upper immediately after the positioning and clamping of the last. The wipers are started forward with the starting of the machine to bring them into contact with the toe of the upper and they are at the same time closed inward into contact with the sides of the toe by the cam 70. During the latter part of the first half revolution of the cam shaft 6 and the several cams thereon, the rocker 44 is rocked by the cam 51 to gradually lift the wipers while in contact with the toe and wipe the shoe upper up against the end of the last, the pincer carrying frame 156 being raised slightly by its cam 163 during the later part of this half revolution to raise the pincers and stretch the upper, and the carrying plates 182 for the side pincers being swung outwardly by the cam 189, while the upper is being wiped up, to stretch and spread the edge of the upper. Coincidently with the lifting of the wipers, the holddown and jack (see Figs. 28-29) are both moved downwardly, the former moving unyieldingly and a greater distance to depress the last and shoe, further comprising the jack spring and increasing the clamping pressure of the spring against the toe support and shoe upper as well as causing the wipers to upwipe the toe. Upwiping action is therefore secured by upward movement of the wipers and coincident downward movement of the last and shoe, the combined movement being figured to position the parts with the shoe sole and wipers approximately in alinement for the subsequent closing-over movement of the wipers. Coincident movement of the last and wipers simultaneously relatively to each other and in opposite directions substantially perpendicular to the plane of the sole has the advantage of providing increased clamping pressure against the upper to insure non-disturbance of the tip line by the upwipe and of affording a greater conforming and stretching pressure against the upper by the wipers during the upwiping movement since loss of conforming pressure, if any, due to bodily lengthwise yielding movement of the wipers, is more than equaled by the additional downward pressure of the last and upper against the wipers. The insole control or toe presser 138 is also lowered during this first half revolution of its cam 181 to bring it into contact with the shoe sole and at the end of the half revolution the stop roller 23 drops into the second notch of its stop wheel and stops the operation of the machine with the wipers in contact with the shoe upper at the edge of the sole portion of the last and the pincers gripping and updrawing and overdrawing the edge of the shoe upper, as shown in Fig. 3, this second position of the parts being indicated on the cams in Figs. 26 to 35 inclusive, by the reference letter b. The pincer carrying member 156 is moved upwardly by its cam with a forward component of movement, so that the center and side pincers updraw and foredraw the upper, the side pincers receiving from the plates 182 a laterally outward movement additional to the upward and forward movement they receive from the carrying members 156. Consequently, at the sidese or corners of the toe, the upper receives updraw, outdraw and foredraw.

If the operator should find, upon the stopping of the machine in position b, that the shoe upper had not been properly wiped up and formed smoothly against the toe of the last, he could reverse the operation of the machine by throwing in the reversing clutch 34 and thus return the parts to open or first position, and then by actuating the clutch 8, repeat the operation. This may be done any desired number of times, and he may also lift and swing the side pincers 146 manually by means of the handles 194 independently of the automatic operation to further stretch and spread the upper before or during the wiping operation and remove any wrinkles that may have formed in the upper.

When the operator finds upon the stopping of the machine in its second position that the shoe upper has been properly wiped up and formed smoothly against the end of the last, he will continue the lasting by again throwing in the forward clutch 8, and during the turning of the cams from position $b$ to $c$ or until the stop roll drops into the third notch 22 of the stop wheel, with the parts in the position shown in Fig. 4, the wipers will be advanced over the edge of the shoe sole upon the last by the wiper cams 63 and 70 and coincidently the rocker will be rocked slightly by its cam 51 to force said wiper plates down hard against the edge portion of the upper and the edge of the shoe sole, the spring 59 yielding before the downward pressure becomes sufficient to overcome the jack spring and depress the last, and the closing-in movement of the wipers being limited as previously described by the cam 70 and the tensioned spring locking pawls or dogs 87 which prevent the springs 84 and 85 from acting to close the wiper plates independently of the wiper closing cam 70. During this turning from position $b$ to $c$, the pincers are all gradually lifted by the cam 163 which actuates the pincer carrying frame to keep the shoe upper under tension, and the jaws of the several pincers are held in firm gripping engagement with the shoe upper by their closing cams 167 and 176.

Again, if it is found by the operator, when the machine stops in third position, that the upper has not been properly formed over and down upon the edge of the shoe sole, he may reverse the machine by operating the reversing clutch, thus returning the parts to the position $b$, and this repetition may be made as many times as desired.

The lasting operation may be completed and the last released by throwing in the forward clutch when the machine is in third position, the wipers being thrust forwardly and closed slightly during the first portion of the turning of the cams 63 and 70 and then retracted from over the edge of the shoe sole and opened to their full extent during the remainder of the turning of said cams to their original position or position $a$. As the wipers approach the limit of their forward movement, the pincer carrying frame is lifted to the limit of its upward movement, thus raising the pincers and giving the upper a final sudden pull to thoroughly stretch its edge, this movement ordinarily being sufficient to pull the edge of the upper from between the pincer jaws and free the shoe from the pincers, and said frame is then lowered to lower the pincers into position to readily engage the edge of an upper upon the next last to be placed in the machine. The insole or toe presser is raised by its cam 181 before the wipers finish their forward movement to get out of the way of the wipers and to jump the lip of the sole so that the upper may be formed down hard into the outer angle of the lip by the wipers, and the hold-down cam 126 and jack cam 106 are formed to lower the last support slightly and relieve the pressure of the wiper plates upon the formed-over edge of the upper to permit a wire to be readily drawn in for securing the upper in lasted position before the return of the parts to open position and the final release of the last.

By providing the spring 67 within the stem of the wiper head, the wiper plates are moved bodily forward with a limited yielding movement, the amount which the spring may yield being determined by the position of the adjusting nut 64 which is adapted to engage the end of the stem after the spring has been compressed, as shown in Fig. 4, and give a positive rigid forward movement to the wipers. Injury to the shoe upper at the extreme end of the last is thus obviated as the wipers may move bodily against the action of said spring longitudinally of the last as they wipe up in contact with the shoe upper upon the upwardly and rearwardly inclined surface of the extreme end of the toe of the last, and a positive forward movement of the wipers over the edge of the shoe sole to form the upper accurately and down hard into the angle at the base of the lip of the insole, is secured by arranging the nut 64 so that it will engage the end of the stem.

By providing a rigid vertically movable toe support comprising the jack and hold-down and the rigid heel abutment or member 117 together with the supporting spindle 114, the last is securely held against the endwise thrust or wiping over movements of the wipers, and as the last with a shoe upper thereon is accurately clamped between the jack and hold-down, the upper is held thereby against movement upon the last and the displacement of the tip line is effectually prevented. Owing to variations in the thickness of stock and shape of lasts, it is however, necessary, in order to prevent breakage of the parts or injury to the shoe, to provide a yielding contact of the wipers with the shoe in their downward or rocking movement toward the face of the shoe sole, as previously stated this yielding movement also preventing such a pressure being put upon the shoe by the wipers that the clamping power of the jack and presser will be overcome and the last or upper displaced. The spring 59 is therefore placed in the bore of the tail member 50 on the rocker to permit the roll 53 to move relatively to said member when a variation in the thickness of the stock or some other impediment prevents the downward and forward or rocking movement of the wiper plates in forming the edge of the shoe upper over and down upon the edge of the sole. The tension of this spring may be accurately adjusted by means of the nut 58 to give the desired forming contact of the wipers with the work, said spring always being set so that it will yield before the pressure of the wipers on the work becomes greater than the clamping action of the jack and presser. All possibility of the displacement of the tip line during the lasting operation is therefore obviated.

To provide for lasts of different widths, the side pincers 146 are adjustably attached to their supporting plates 182 so that they may be swung toward or from the sides of the last upon said plates, independently of their automatic swinging movement, each plate being formed with the slot 191 so that the stud 192 may be adjusted therein to swing the pincer head about the vertical axis of its carrying stem 150, and the coupling sleeves 186 provide means for adjusting the plates 182 about their pivots 183 independently of the movement imparted to them by the pincer spreading cams 189. In the drawing, the stop wheel 19 is shown as provided with three stop notches for stopping the machine at three different points in its cycle of operation, but it will be understood that any desired number of notches may be properly positioned in the wheel to automatically stop the wheel in any desired position, and other and further changes in the construction and arrangement of parts may be made without departing from the spirit of my invention. I do not therefore limit myself to the particular form or construction shown and described.

What I claim is:

1. In a machine of the character described, the combination with means for forming a shoe upper against the end of a last, means for clamping an end portion of a last to hold the same in position to be acted upon by said forming means, a fixed support and a rigid member adjustable upon said support longitudinally of the last into engagement with the other end of the last.

2. In a machine of the character described, the combination with reciprocable means for forming a shoe upper against the end of a last and means for reciprocating said forming means, of members adapted to engage the upper and lower side of a last, means for actuating said members in timed relation to the reciprocation of said forming means to bring them into clamping position relatively to an end portion of said last, a fixed support, and a movable abutment on said support adapted to be moved into contact with an end of said last to prevent endwise movement thereof.

3. In a machine of the character described, the combination with means for forming a shoe upper against the end of a last and means for actuating said forming means, of a movable support for one end of the last, means for holding the last upon its support, and a supporting member for the other end of the last movable toward and from the first named support and adapted to swing about the axis of said support.

4. In a machine of the character described, the combination with means for forming a shoe upper against the end of a last, of a movable support, a carrying member adapted to swing about the axis of said support, a support on said carrying member adjustable toward and from the first named support, and means for locking the last named support in the position to which it is adjusted upon the carrying member.

5. In a machine of the character described, the combination with reciprocable wipers and power means for actuating the same, of a last support, means for clamping the end portion of a last upon said support, power operating means for relatively moving said last-named means and the support to effect the clamping of the last, a pivoted spindle to support the opposite end portion of the last and permit the last to swing toward and from the support, and an abutment adjustable into engagement with the end of the last.

6. In a machine of the character described, the combination with reciprocable wipers and means for actuating the same, of a jack for supporting the end portion of a last, a presser member for clamping the last upon said jack, a member adapted to swing about the vertical axis of the jack, a carrying member adjustable upon the swinging member toward and from the jack, means for locking the carrying member in the position to which it is adjusted, a pivoted spindle on the carrying member to engage the end portion of the last, and an extension on the carrying member forming a fixed abutment to engage the end of the last.

7. In a machine of the character described, the combination with reciprocable wipers and means for actuating the same, of a movable jack to engage the end portion of a last and support the same, a movable presser member to engage the last and clamp the same on the jack, a fixed member having a track formed concentric with the axis of the jack, a carriage movable along said track, a member adjustable along the carriage toward and from the jack and formed with an upwardly extending portion forming an abutment for the end of the last, a spindle pivoted to the carrying member upon an axis extending transversely of the last, and means for locking said member in the position to which it is adjusted upon the carriage.

8. In a machine of the character described, the combination with reciprocable wipers for forming an upper against the end of a last, a jack to engage the toe portion of the last, a presser to engage the last and hold the same in position on the jack, a fixed supporting bracket, a carriage upon said bracket adapted to swing about the vertical axis of the jack, a rack on the carriage, a supporting member movable upon the carriage toward and from the jack longitudinally of said rack, a transverse shaft on said carrying member, a pinion on the shaft engaging the rack, a ratchet on the shaft, a pawl engaging the ratchet, a spindle pivotally attached to the carrying member to turn upon an axis extending transversely of the last, and an upward extension on the carrying member forming an abutment to engage the end of the last.

9. A toe lasting machine having, in combination, toe lasting wipers, a vertically movable toe support, means to clamp the toe end of a last and upper on said support for coöperation with said wipers, a heel pin bodily adjustable toward and from the toe support for last length and angularly adjustable relatively to said toe support about the vertical axis of the toe support for last swing, and an abutment member for the heel end of a shoe adjustable with said heel pin and arranged to prevent lengthwise displacement of the last mounted upon said pin by the thrust of the wipers.

10. In a toe lasting machine, the combination with toe embracing wipers, of means for supporting the shoe against the outward thrust of the wipers comprising an outwardly extending bracket, a swinging platform mounted on the bracket for curvilinear movement transversely for right and left lasts, a carriage mounted on the platform for adjustment toward and from the wipers for lasts of different lengths, and a rigid member rising from the carriage and formed on its forward side to present an unyielding abutment for the heel end of the last, and a last pin mounted on the carriage to permit movement of the last toward the abutment.

11. In a toe lasting machine, end embracing wipers, a toe rest, and means for supporting the shoe against the outward thrust of the wipers comprising a carriage, a rigid last end abutment rising from the carriage, a last pin mounted on the carriage to move freely toward and from the abutment, a support on which the carriage is mounted to be advanced to variable positions to locate the toes of different lengths of lasts against the wipers and to bring the abutment into contact with the heel of the last for taking the thrust of the wipers, and means to lock the carriage in advanced position.

12. In a toe lasting machine, end embracing wipers, a toe rest, and means for supporting the shoe against the outward thrust of the wipers comprising a carriage, a rigid last end abutment rising from the carriage, a last pin mounted on the carriage to move freely toward and from the abutment, a laterally swinging support on which the carriage is mounted, to be advanced to variable positions to locate the toes of different lengths of lasts against the wipers and to bring the abutment into contact with the heel of the last for taking the thrust of the wipers, and means to lock the carriage in advanced position.

13. In a machine of the character described, the combination with a last support and wipers for forming a shoe upper against said last, of carrying means for raising and lowering said wipers relatively to said last, means for permitting said wipers to yield in the direction of their downward movement, and means for actuating said carrying means.

14. In a machine of the character described, the combination with a last support and wipers for forming a shoe upper against said last, of carrying means for raising and lowering said wipers relatively to said last, means for permitting said wipers to yield in the direction of their downward movement, means for actuating said carrying means, and means for adjusting the yielding means to vary its tension.

15. In a machine of the character described, the combination with a last support and wipers adapted to form a shoe upper against a last and edge of a shoe sole thereon and into contact with the bottom of said sole along the edge, of carrying means for said wipers, means for actuating said carrying means in timed relation to the movement of the wipers, and means operating to permit said wipers to yield in the direction of their movement toward the bottom surface of the sole in forming the edge of the upper against said surface.

16. In a machine of the character described, the combination with a last support and lasting means adapted to be actuated to form a shoe upper over and upon the edge of a sole upon the last, of a carrying member, an actuating member for moving the carrying member to force the wipers toward the bottom surface of the sole, means for operating the lasting means independently of said actuating member to project the same over the edge of the sole, and yielding means interposed between the actuating member and the carrying member to provide a yielding contact between the lasting means and the formed over edge of the shoe upper in the movement of the wipers toward the bottom of the sole.

17. In a machine of the character described, the combination with means for supporting a last, of wipers, a rocker for carrying the wipers, means for actuating the rocker, and means operating to permit said wipers to yield in the direction of their movement when moved by the rocking movement of the rocker.

18. In a machine of the character described, the combination with means for supporting a last in position for lasting, of wiper plates, means for moving the wiper plates to project the same over the edge of a shoe sole upon a last and form an upper down thereon, a carrying member for the wiper plates adapted to be moved to force the wiper plates into contact with the shoe upper when projected over the edge of the sole upon the last, and means for yieldingly moving the carrying member.

19. In a machine of the character described, the combination with means for supporting a last, of wiper plates, a carrier for said plates adapted to swing and move said plates in contact with a shoe upper upon the last to form said upper against the end of the last by rubbing contact therewith, means for moving the wiper plates to form the shoe upper over the edge of a shoe sole upon the last, and means for yieldingly swinging the carrier downwardly to press and compact the upper over the edge of the sole.

20. In a machine of the character described, the combination with means for supporting a last in position for lasting, of wiper plates, a rocker member for carrying said plates adapted to be rocked to raise and lower said plates relatively to the last, a cam, and means for transmitting motion from said cam to said rocker adapted to yield under heavy resistance to the movement of the wipers when actuated by said carrying member.

21. In a machine of the character described, the combination with means for clamping a last and supporting the same in position for lasting, wiper plates, a member for carrying said wiper plates pivotally supported and adapted to rock to raise and lower the plates relatively to said last, a power driven cam, and a coöperating roll yieldingly carried by the rocking member.

22. In a power operated toe lasting machine, the combination with a normally open toe clamp comprising a toe post yieldable against the resistance of a heavy spring and adapted to engage the shoe at the tip seam, and a hold-down having a predetermined length of movement, toe embracing wipers, and operating means for the wipers including means for forcing the wipers downwardly upon the margin of the shoe bottom, and a spring in said last-named means proportioned to yield before the spring in the toe post is caused to yield.

23. In a machine of the character described, the combination with lasting means for forming a shoe upper against the end of a last, of means for engaging the shoe upper and stretching the same during the lasting operation, and means for manually actuating the stretching means independently of its automatic operation.

24. In a machine of the character described, the combination with lasting means for forming a shoe upper upon a last against the same, of means for gripping the edge of the upper, power means for relatively moving said gripping means and last to stretch the upper in timed relation to the actuation of the lasting means and during the lasting operation, and manually operable means for relatively moving said gripping means and last independently of the automatic operation.

25. In a machine of the character described, the combination with lasting means for forming a shoe upper upon a last against the same, of a plurality of grippers for gripping the edge of the upper, power means for relatively moving said grippers and last to stretch the upper in timed relation to and during the lasting operation, and manually operable means for moving a gripper independently of the other grippers and independently of the automatic operation.

26. In a machine of the character described, the combination with lasting means for forming a shoe upper against the end of a last, of gripping means for engaging the edge of a shoe upper, power means for moving the gripping means in timed relation to the actuation of the lasting means to stretch the shoe upper during the lasting operation, and hand operable means for moving the gripping means to stretch the upper.

27. In a machine of the character described, the combination with means for supporting a last in position for lasting and lasting means to engage a shoe upper upon a last and form the same against the end thereof, of pincers to engage the edge of the shoe upper, power means for bodily moving the pincers to stretch the upper in timed relation to the movement of the lasting means and during the lasting operation, and means for manually moving the pincers bodily to stretch the shoe upper independently of said power means.

28. In a machine of the character described, the combination with lasting means for forming a shoe upper against the end of a last, of gripping means for engaging the edge of a shoe upper, power means for actuating the gripping means laterally of the last to spread the shoe upper during the lasting operation, and manually operable means for actuating the gripping means laterally of the last to spread the shoe upper independently of the automatic operation.

29. In a machine of the character described, the combination with lasting means for forming the shoe upper against the end of a last, of pairs of pincers for engaging the edge of the shoe upper at each side of the last, power means for moving the pincers outwardly from the sides of the last during the lasting operation to spread and stretch the shoe upper, and manually operable means for moving the pincers toward and from the last and raising the same relatively to the last to stretch the shoe upper independently of the automatic operation.

30. In a machine of the character described, the combination with means for supporting a last with a shoe upper thereon in position for lasting and wipers to engage the shoe upper and form the same against the end of the last, of a plurality of pincers to engage the edge of the shoe upper, power means for automatically swinging the pincers to spread the shoe upper and for moving the pincers to stretch the shoe upper, and handles connected to the pincers to swing the same independently of their automatic operation, said handles forming levers to move the pincers to stretch the shoe upper independently of their automatic operation.

31. In a machine of the character described, the combination with lasting means and means for supporting a last with a shoe upper thereon in position for lasting, of a plurality of pincers for engaging the shoe upper, carrying means for the pincers and to which the same are adjustably attached to permit of the adjustment of the pincers relatively to the last, and means for moving the carrying means to move the pincers toward and from the last laterally thereof.

32. In a machine of the character described, the combination with wiping means and means for supporting a last in position for lasting, of pincers for engaging the edge of a shoe upper upon the last, a carrying member for the pincers, means for actuating the carrying member to move the pincers and stretch the shoe upper, a member carried by the carrying member and to which the pincers are attached, and power means for moving said member to swing the pincers toward and from the side of the last and stretch the upper in timed relation to the lasting operation.

33. In a machine of the character described, the combination with lasting means and means for supporting a last with a shoe upper thereon in position for lasting, of pincers for engaging the edge of the upper, a carrying member, means for actuating the carrying member to raise and lower the pincers relatively to the last, a carrying plate pivotally attached to the carrying member and adapted to support the pincers, and means for turning said plate upon the carrying member to move the pincers toward and from the side of the last.

34. In a machine of the character described, the combination with lasting means and means for supporting a last in position for lasting, of a plurality of pincers for engaging the edge of a shoe upper upon a last, a carrying member for the pincers, carrying plates pivotally attached to the carrying member and to which the pincers are adjustably attached, power means for swinging the plates to move the pincers toward and from the last and stretch the shoe upper, and manually operable means for actuating the pince. independently of their automatic operation to stretch the shoe upper and spread the same.

35. In a machine of the character described, the combination with lasting means and means for supporting a last with a shoe upper thereon in position for lasting, of pincers for engaging the shoe upper, a carrying member for the pincers, power means for actuating the carrying member to move the pincers and stretch the shoe upper, and a hand lever carried by the carrying member and engaging the pincers to actuate the same independently of the movement of the carrying member.

36. In a machine of the character described, the combination with means for lasting and means for supporting a last in position for lasting with a shoe upper thereon, of pincers for engaging the edge of a shoe upper, a carrying member upon which the pincers are movably supported, yielding means to resist the movement of the pincers upon said carrying member, and a hand lever to move the pincers against the action of the yielding means independently of the carrying member.

37. In a machine of the character described, the combination with pincers having movable jaws, means for automatically closing the jaws to grip the work, and manually operable means for closing each jaw independently of the others and independently of the automatic means.

38. In a machine of the character described, in combination, pincers having movable jaws, power operated means for closing said jaws to grip the edge of an upper upon a supported last, end embracing wipers, mechanism for actuating said wipers to form the upper to the end of the last and over the edge of a sole on the last, mechanism automatically operative in timed relation to and during forming actuation of the wipers bodily to move the closed pincers relatively to the wipers to draw and stretch the upper, and manually operable means for moving the pincers to draw and stretch the upper supplementally to and independently of the automatic operation of the pincers.

39. In a machine of the character described, in combination, end embracing wipers, pincers having movable jaws, power operated means for closing said jaws to grip the edge of the upper at the end of a supported last and subsequently in timed relation, to cause said pincers to updraw and outdraw the gripped upper to stretch and prepare the upper for the lasting operation of the wipers, mechanism for operating the wipers to form the upper to the end of the last and over the edge of a sole on the last, and hand operable means for bodily moving the pincers to stretch the upper independently of the automatic operation of the pincers.

40. In a machine of the character described, the combination of pincers having movable jaws, means for actuating the movable jaws to close the pincers, power means for automatically actuating the closing means, and a hand lever for actuating the closing means and moving the pincers bodily and independently of their automatic operation.

41. In a machine of the character described, the combination of pincers having movable jaws, a vertically movable member for closing the jaws, an automatically operated lever for actuating said member, a pivoted carrying member for the pincers, automatically operating means for moving said carrying member to move the pincers bodily, and a hand lever carried by the carrying member adapted to operate the same to move the pincers bodily and connected to the member for closing the jaws.

42. In a machine of the character described, the combination of pincers having a fixed jaw and a movable jaw, a reciprocable jaw closing member, an automatically operated lever for actuating the jaw closing member, a pivoted carrying member for the pincers, a plate pivotally attached to the carrying member and to which the pincers are attached, means for automatically turning the plate to move the pincers bodily, and a hand lever pivotally carried by the plate and connected to the reciprocable closing member for the jaws and to the pincers to reciprocate said member and to move the pincers bodily.

43. In a machine of the character described, the combination of end pincers for engaging a shoe upper on a last at the end thereof, side pincers to engage the shoe upper at the sides of the last, a common carrying member for all of the pincers, plates pivotally attached to the carrying member for operating the side pincers, and power means for actuating the plates in timed relation to the movement of the carrying member to swing the side pincers toward and from the sides of the last and stretch the shoe upper.

44. In a machine of the character described, the combination of pincers having a movable jaw, a rod for actuating the movable jaw, a carrier for the pincers, a power operated lever having an opening through which the rod extends, means on the rod for engaging the lever to cause the lever to actuate the rod and close the jaw when the lever is moved and to permit a free movement of the rod relatively to the lever, and a hand lever connected to the rod to move the same and close the jaw independently of the power operation of the lever.

45. In a machine of the character described, the combination of a plurality of pincers, a carrying member for all of said pincers, power means for actuating said carrying member to raise and lower the pincers, plates pivotally attached to the carrying member and to which plates the pincers are pivotally connected, means for holding each pincer to its plate in the position to which it is adjusted thereon by turning it on its pivotal connection with the plate, and power means for turning said plates upon their pivotal connection with the carrying member to move the pincers toward and from the sides of the last.

46. In a machine of the character described, the combination with pincer carrying means, of pincers having a movable jaw and an operating member to open and close said jaw, a power lever for actuating said closing member, and a hand lever pivotally supported intermediate its end, and having pivotal connection with said closing member to move the same.

47. In a machine of the character described, the combination with pincer carrying means, of pincers comprising a body formed with a fixed jaw, a movable jaw, means for actuating the movable jaw, a power lever to actuate said means, a hand lever for actuating said means independently of the lever, and means carried by the hand lever for engaging the body of the pincers to lift said pincers bodily.

48. In a machine of the character described, the combination of pincers, a pivotally supported pincer carrying member to which the pincers are attached to turn therewith toward and from the side of the last, power means for turning said carrying member including a cam, and manually operable means for turning said carrying member independently of the action of said cam, 49. In a machine of the character described, the combination with pincer carrying means, of pincers comprising a head formed with a fixed jaw and having a movable jaw, an upwardly extending rod for actuating the movable jaw, a power actuated lever for moving the rod, a spring to resist the bodily upward movement of the pincers, a hand lever pivotally carried by the carrying member, and an equalizing bar engaged by the hand lever and connected at one end to the said rod and engaging the pincer head at its opposite end, said bar being arranged to first transmit motion from the hand lever to the rod and to then engage the head and lift the same after the rod has been lifted and the jaws closed.

50. In a machine of the character described, the combination with a pincer carrying member, of pincers comprising a head having a fixed jaw and a stem extending upwardly from the head to engage the carrying member and support the pincers, a movable jaw, a rod for actuating the movable jaw, a spring sleeved upon the stem to resist the upward movement of the head, a power actuated lever for moving the rod to close the movable jaw, and a hand lever connected to the rod to actuate the same and to lift the head against the action of said spring.

51. In a machine of the character described, the combination with lasting means and means for supporting a last with a shoe upper thereon in position for lasting, of a plurality of pincers comprising side and end pincers, a common carrying member for all of said pincers, a cam for actuating said carrying member to raise and lower the pincers, plates pivotally attached to the carrying member and to which plates the side pincers are attached, means embodying a cam for turning said plates and swinging the side pincers toward and from the last in timed relation to the movement of said pincers by the carrying member, a member for each of the pincers for opening and closing the same, a power lever for each of said members, a cam for actuating said levers which open and close the side pincers, and a separate cam for the lever which is adapted to open and close the end pincers.

52. In a toe lasting machine, the combination with lasting means for forming a shoe upper against the end of a last, of gripping means for engaging the edge of the upper at opposite sides of the toe of the last, power means for actuating the gripping means to stretch the upper and to come to rest holding the upper under tension, and manually operable means for moving said upper-engaging gripping means laterally of the last at either side of the last separately to spread the shoe upper independently of the automatic operation.

53. In a toe lasting machine, the combination with means for supporting the last with a shoe upper thereon in position for lasting, and power operated wipers to engage the shoe upper and form the same against the toe of the last, of pincers to engage the edge of the shoe upper at each corner of the toe, and power operated means for swinging the pincers outwardly to spread the shoe upper and for moving the pincers upwardly to stretch the shoe upper.

54. In a lasting machine, the combination with wiping means, of a pincer for pulling the upper and holding it for the action of the wiping means and comprising a head having a slot therein and provided with a lower gripping jaw curved downwardly and forwardly from the lower end thereof, a cooperating jaw, a jaw carrying lever fulcrumed on the head within the slot and to the front end of which the jaw is pivoted between its ends, an operating slide for the lever, and a jaw motion controlling link pivotally connecting the upper end of the jaw to the head.

55. In a toe lasting machine, the combination with end embracing wipers, of a toe end pincer, a carrier therefor, toe corner pincers, and swinging plates supporting the corner pincers and angularly adjustable on said carrier for positioning the corner pincers relatively to the end pincer and operating said pincers together.

56. In a toe lasting machine, the combination with end embracing wipers, of a toe end pincer, a carrier therefor, toe corner pincers, swinging plates mounted on said carrier and supporting the corner pincers, and operating means for lifting the carrier and swinging the supporting plates to impart updrawing and corner spreading motion to the pincers.

57. In a toe lasting machine, the combination with end embracing wipers, of a toe end pincer, a carrier therefor, toe corner pincers, swinging plates pivoted on said carrier in front of the corner pincers and supporting the corner pincers, and operating means for lifting the carrier and swinging the supporting plates to impart updrawing movement to the toe end pincer and a combined foredrawing and outward spreading motion to the toe corner pincers.

58. In a toe lasting machine, the combination with end embracing wipers, of a toe end pincer, toe corner pincers, and operating mechanism for imparting to the corner pincers a foredrawing and outdrawing motion and for yieldingly updrawing the stock held by the toe pincer to render taut the stock foredrawn by the corner pincers.

59. In a toe lasting machine, the combination with end embracing wipers, of a toe end pincer, toe corner pincers, and means for updrawing the upper by the toe pincers, and means for automatically swinging the corner pincers about vertical axes away from the sides of the last in timed relation to the updrawing movements.

60. In a machine of the character described, the combination with means for supporting a last with a shoe upper thereon in position for lasting, of wiper members adapted to embrace the end of the last and to swing into contact with the shoe upper and over a shoe sole upon the last, power means for swinging said members to project the same over the edge of the shoe sole and form the edge of the upper down thereon, including means tensioned by contact of the wiper members with the shoe upper, means for locking said tensioned means to prevent the same from actuating said members, and means for unlocking said locking means at the end of the lasting operation.

61. In a machine of the character described, the combination with means for supporting a last with a shoe upper thereon in position for lasting, pivotally supported wiper plates, power means for turning said plates into contact with the shoe upper and to project the edges of said plates over the edge of a shoe sole upon a last, said means embodying a rod, a member slidable upon the rod, a spring sleeved upon the rod to transmit motion from said member to the rod and to yieldingly resist the movement of the member upon the rod, a pawl and ratchet connection between said member and rod, and means for releasing the pawl and permitting the expansion of the spring tensioned at the end of the lasting operation.

62. In a machine of the character described, the combination with means for supporting a last with a shoe upper thereon in position for lasting, pivotally supported wiper plates adapted to embrace the end of the last and power means for actuating said plates to project the same over the edge of a shoe sole upon the last embodying a rod for transmitting motion to each of said plates, an equalizing bar having an eye at each end through which the rods are adapted to slide, springs sleeved on the rods to resist the sliding movement of the equaling bar on the rods, a pawl carried by the equalizing bar at each end thereof, ratchets on the rods to be engaged by the pawls, and means for releasing the pawls from their ratchets.

63. In a machine of the character described, in combination, end wipers mounted for bodily and swinging movement to embrace the end of the last and to close over the edge of a sole on the last, means for supporting a last with a shoe upper and sole thereon in coöperative relation to the wipers, means to close the wipers to conform the wipers to the contour of the last end preparatory to advancing the wipers over the edge of the sole to lay the upper down over the sole, power mechanism uniformly to close the wipers over the edge of the sole, with means operative to lock the wipers, when conformed to the contour of the last end, against closing movement independently of said power mechanism.

64. In a machine of the character described, in combination, pivoted end wipers adapted to embrace the end of a last, means for supporting a last with a shoe upper and sole thereon in coöperative relation to the end of the wipers, means operative independently to close the wipers to conform them to the contour of the last end preparatory to advancing the wipers over the edge of the sole to lay the upper down over the sole, power-operated mechanism to close the wipers over the edge of the sole to a uniform and determinate extent, and means automatically operative, when the wipers have conformed to the contour of the last end, to lock said wipers against further closing movement independently of said power-operated mechanism.

65. In a machine of the character described in combination, pivoted end wipers adapted to embrace the toe end of a last, means for supporting a last with the toe ends of its shoe upper and sole in coöperative relation to the wipers and with the sole above the plane of the wipers, means independently to close the wipers against the upper to conform them and the upper to the contour of the toe preparatory to advancing the wipers over the edge of the sole, means to lock the wipers against displacement from such conforming position, means relatively to move the last and wipers to position the sole and wipers in approximately the same plane, and power-operated mechanism to cause said wipers to close over the edge of the sole to a uniform and predetermined extent.

66. In a machine of the character described in combination, pivoted end wipers adapted to embrace the toe end of a last, means for supporting a last with a shoe upper and sole thereon in coöperative relation to the wipers and with the sole above the plane of the wipers, power-operated mechanism operative yieldingly and independently to close the wipers to conform the wipers to the contour of the toe, means automatically to lock the wipers against displacement from said conforming position, and means subsequently and relatively to move the wipers and last to position the sole and wipers in approximately the same plane, said power-operated mechanism being effective subsequently and in timed relation to close the wipers over the edge of the sole to a uniform and predetermined extent.

67. In a machine of the character described, in combination, pivoted end wipers adapted to embrace the toe end of a last, means for supporting a last with a shoe upper and sole thereon in coöperative relation to the wipers, means arranged to advance and independently to close the wipers against the upper to conform the wipers and upper to the contour of the toe end of the last and to tension the wipers against the end of the last, means relatively to move the last support and wipers with the wipers in contact with the upper to cause them to upwipe the upper over the toe end of the last and to position the wipers and shoe sole approximately in the same plane, power-operated mechanism effective in timed relation to said relative upwiping movement to cause said wipers to close over the opposite sides of the sole edge to a uniform extent predetermined to avoid injury to the lip of the sole, and means automatically operative, when the wipers have advanced and independently closed into conforming relation to the contour of the toe end, to lock the tensioned wipers against further closing movement independently of said power-operated mechanism.

68. In a toe lasting machine, the combination with means for supporting a last with a shoe upper thereon in position for lasting and toe embracing wipers organized to cause the wipers to engage the upper below the shoe bottom and wipe upwardly and then inwardly over the shoe bottom, of operating mechanism organized to cause the wipers to engage the upper below the shoe bottom and wipe upwardly and then inwardly over the shoe bottom and including closing and advancing mechanism for the wipers comprising yielding elements and a non-yielding actuator enabling the wipers to adapt themselves to the work and means to lock the wipers to the non-yielding actuator before the wipers begin their inward movement over the shoe bottom.

69. A toe lasting machine comprising means for supporting a last with a shoe upper thereon in position for lasting, toe embracing wipers, mechanism organized to cause the wipers to engage the upper below the shoe bottom and wipe upwardly and then inwardly over the shoe bottom, operating mechanism for advancing and closing the wipers including yielding elements and a non-yielding actuator in the closing means enabling the wipers to adapt themselves to the width of the toe end of the shoe during the upwiping movement, said yielding element normally tending to impel the wipers over the sides of the toe of the shoe instantaneously without waiting for the non-yielding actuator when the plane is reached in which the wipers can close, and means to lock the yieldingly operated wipers against excessive closing movement.

70. In a machine of the character described, the combination with pivotally supported wiper plates adapted to embrace the end of a last, and means for actuating said plates to close the same upon the end of a last, a longitudinally movable carrying head for said plates adapted to be moved to bring the plates into contact with a shoe upper on the last, a cam, a bar actuated by said cam, and a yielding connection between said bar and said head to yieldingly move the head and bring the wiper plates into contact with the work.

71. In a machine of the character described, the combination of pivotally supported wiper plates adapted to embrace the end of a shoe last and to be closed toward each other to engage a shoe upper upon the last, a carrier head for the wiper plates having a hollow stem, a supporting member having a bore to receive the stem and in which the stem is longitudinally reciprocable, a bar projecting into the hollow stem, a cam to actuate the bar, a spring interposed between the inner end of the bar, and the head, and stops on the bar to engage the stem and reciprocate the head, one of said stops being adjustable upon the bar.

72. In a machine of the character described, the combination with means for supporting a last with a shoe upper thereon in position for lasting, of wiper plates adapted to embrace the end of the last and to be closed thereon into contact with the shoe upper, a wiper head for carrying said plates formed with a hollow stem, a rocker formed with a bore to receive the hollow stem, means for actuating the rocker to raise and lower the wiper plates, a bar extending at one end into the hollow stem, a cam to engage and actuate the bar, a spring in the hollow stem engaging the end of the bar, a stop fixed in the end of the hollow stem, a stop on the inner end of the bar to engage the stop on the stem, and an adjustable nut on the stem to engage the end of the stem.

73. In a machine of the character described, in combination, means for forming a shoe upper to the end of a last, power-operated mechanism for actuating said forming means, and manually controlled means for causing said mechanism to repeat a determinate portion of the forming operation without releasing the shoe.

74. A machine of the class described, having in combination, end lasting means, means to support the end of a last and shoe upper in coöperative lasting position, and power-operated mechanism to cause the lasting means to form the upper materials to the end of the last and over the edge of the shoe sole thereon, including means automatically operative to arrest the operation of the machine at a determinate point in the cycle, and manually controlled means to actuate said mechanism to cause it to repeat a preceding portion of the operation without releasing the shoe.

75. In a machine of the character described, the combination of wipers for forming a shoe upper around and against the end of a last, power means for automatically operating said wipers, means for stopping the automatic operation of said means, and means for reversing the direction of motion of said automatically operating means to repeat portions of the lasting operation without releasing the last and shoe upper.

76. In a machine of the character described, the combination with automatically operating means for positioning a shoe upper upon a last, of means arranged to automatically stop said automatically operating means in a pre-determined position during its operation, and means under the control of the operator for starting the machine in a reverse direction to repeat a portion of the operation without releasing the last and shoe upper.

77. In a machine of the character described, the combination of wipers for forming a shoe upper around and against the end of a last, power means for actuating said wipers, means for reversing the direction of actuation, and means for stopping the actuation in either direction with the wipers in different predetermined positions during the cycle of operation without releasing the last and shoe upper.

78. In a machine of the character described, the combination of wiper plates adapted to embrace the end of a last and wipe a shoe upper thereon around and against the end of the last, means for supporting a last with a shoe upper thereon in position for lasting, power means for relatively moving the last support and the wipers to wipe the shoe upper against the end of the last below the sole portion thereof, means for automatically stopping the wiping operation with the wipers in contact with the upper adjacent to the sole portion of the last, means under the control of the operator for reversing the lasting operation when the same has been automatically stopped without releasing the last and shoe upper, and means for again reversing the operation to cause a repetition of a portion of the lasting operation.

79. In a machine of the character described, the combination with wiping means adapted to embrace the end of a last and wipe a shoe upper against the same, means for supporting a last with a shoe upper thereon in position for lasting, a forward clutch for transmitting motion to actuate said wiping means in one direction, a reversing clutch for transmitting motion to actuate said wiping means in a reverse direction, and means for stopping the transmission of motion at a pre-determined point in the lasting operation.

80. In a machine of the character described, the combination with lasting means and means for supporting a last in position for lasting, of power means for actuating said lasting means, means for stopping said power means at a pre-determined point during the lasting operation, means for actuating the power means including a forward clutch and a reverse clutch, and means for separately operating each of said clutches and simultaneously releasing said stopping means.

81. In a machine of the character described, the combination with wiping means and means for supporting a last in position for lasting with a shoe upper thereon, of power means for actuating said wiping means including a power shaft and a cam shaft, a stop member on the cam shaft, a member to engage the stop member and hold the cam shaft against turning, means for transmitting motion to actuate the power shaft including a forward clutch and a reverse clutch, and separate means for actuating each of said clutches and simultaneously releasing the stop member on the cam shaft.

82. In a machine of the character described, the combination with lasting means and means for supporting a last in position for lasting, of power means for actuating the lasting means including a cam shaft, a stop wheel on the cam shaft having notches in its periphery, a member to ride upon the periphery of the stop wheel to engage the notches to stop the cam shaft, means for transmitting motion to the cam shaft including a clutch, a lever for actuating the clutch and holding the same in operative position, means for connecting said lever and the member which rides upon the stop wheel including a latch for connecting and disconnecting the same, and means for operating the latch.

83. In a machine of the character described, the combination with lasting means and means for supporting a last in position for lasting, power driven means for actuating the lasting means including a cam shaft, a stop wheel on the shaft having notches, a member provided with a roller to ride upon the periphery of the wheel and engage the notches, means for transmitting motion to the cam shaft including a clutch, a lever for actuating the clutch and holding the same in operative position, a bar pivotally connected to the lever, a latch carried by the bar, and means for swinging the latch into engagement with the member for engaging the stop wheel to connect said member and the lever for actuating the clutch.

84. In a machine of the character described, the combination with means for forming a shoe upper upon a last, of power actuated means for actuating said forming means, said power means including a power shaft and a cam shaft, a stop wheel on the cam shaft having notches in its periphery, a member adapted to ride upon the periphery of the stop wheel and engage the notches, a forward clutch and a reverse clutch on the power shaft, means for transmitting motion from the power shaft to the cam shaft, a lever for actuating each of said clutches, means connecting said lever and the stop member engaging the stop wheel to move the stop member out of engagement with a notch of the stop wheel when either one of the levers is actuated to throw its clutch, and means for preventing the throwing out of the clutches while the stop member is riding upon the periphery of the stop wheel.

85. In a machine of the character described, the combination with lasting means and means for supporting a last with a shoe upper thereon in position for lasting, of power actuated means for actuating the lasting means including a power shaft and a cam shaft, a forward clutch and a reverse clutch on the power shaft, levers for throwing said clutches into operative position and holding the same, a stop wheel on the cam shaft, a member to engage and stop the stop wheel, members connected to the levers for actuating the clutches adapted to move the stop member out of engagement with the stop wheel, and a latch carried by each of said members to engage the stop member, and means for actuating the latches.

86. In a machine of the character described, the combination with lasting means, of means for holding a last with an upper thereon in position for lasting consisting of an upwardly movable post having a head forming a seat for the end portion of the last, a rigid guide for said post, means for moving the post in its guide, a downwardly movable hold-down adapted to clamp the last between it and the head, a rigid guide for said hold-down, and means for moving the hold-down into clamping position.

87. In a machine of the character described, the combination with lasting means, of means for holding a last with an upper thereon in position for lasting consisting of an upwardly movable post having a head, slides dove-tailed one into the head and the other into the post and movable longitudinally and transversely of the machine to adjust themselves to the position taken by the last during the lasting operation, and L-shaped return spring plates attached to the head with free arms extending into position to engage the respective slides.

88. In a machine of the character described, the combination with lasting means, of means for holding a last with an upper thereon in position for lasting consisting of an upwardly movable post having a head, a slide through which the post is freely movable, a collar fastened on the post to abut against a downwardly faced wall of the slide, a lower collar sleeved on the post and threaded in a lower arm of the slide, a spring held under adjustable tension between the collars and permitting depression of the post relatively to the slide, a frame bracket having a guideway in which the slide is vertically movable, and power operated mechanism connected with the slide for effecting such movement.

89. In a machine of the character described, the combination with means for working an upper over the toe of a shoe, of an insole controller comprising a depending stem, a foot member pivotally connected to the stem and adapted to engage the insole adjacent to the sewing rib thereof, and means for adjusting the foot member forwardly and backwardly to permit it to engage the insole alternatively inside or outside of the sewing rib.

90. In a machine of the class described, in combination, wipers arranged to embrace the end of a last, means to support a last with the shoe upper and sole thereon in coöperative relation to the wipers and with the sole on the last above the normal plane of the wipers, means to grip the edge of the upper projecting above the sole at the end of the last, means to close the wipers against the upper below the sole, and mechanism operable to depress the last with its sole and upper to cause the gripping means to updraw and stretch the upper, and coincidently operable to raise the wipers approximately to aline the sole and wipers and to cause the wipers to upwipe the stretched upper against the end of the last, said mechanism being arranged for subsequent operation to close the wipers over the edge of the sole.

91. In a machine of the class described, in combination, wipers arranged to embrace the end of a last, a yielding support for one end of the last and an opposed unyielding member relatively movable to clamp the end of the last between them with the sole and shoe upper in coöperative relation to said wipers and with the sole on the last above the normal plane of the wipers, means to close and yieldingly maintain the wipers pressed against the end of the last below the bottom of the last, and mechanism operative to depress said opposed clamping member to depress the last and more tightly to clamp the upper thereto and to cause the wipers to upwipe the upper, and coincidently operative to raise the wipers relatively to the last also and coincidently to cause the wipers to upwipe the upper and approximately to aline the sole and wipers, said mechanism being subsequently operable to close the wipers over the edge of the sole to lay the edge of the upwiped upper thereover.

92. In a machine for working an upper over a last, the combination with means for positioning the last, means for gripping and tensioning the upper, and end embracing wipers for working the gripped upper over the bottom of a last, of power operating mechanism organized to bring the machine to rest before the completion of the work cycle with the upper under tension, and controlling mechanism by which said power mechanism can be made to run backward to release the work.

93. In a machine for working an upper over a last, the combination with means for positioning the last and means for gripping and tensioning the upper, of power operating mechanism organized to bring the machine to rest with the upper under tension, and two controlling means adapted to be used alternatively at this stage of the machine's operation to cause the said power operating mechanism either to run the machine forwardly to complete the over-working operation or to run the machine backwardly to release the shoe without completing the operation.

94. In a machine for working an upper over a last, the combination with means for positioning the last, means for gripping and tensioning the upper and end embracing wipers for working the gripped upper over the bottom of a last, of power operating mechanism, starting and stopping mechanism therefor including means arranged for optional use to bring the machine to rest before completing the work cycle with the upper under tension, and controlling means by which the machine may be run either forwardly, continue the cycle, or backwardly to a position for repeating a portion of the cycle when it is restarted.

95. In a machine for working an upper over a last, the combination with means for positioning the last, means for gripping and tensioning the upper, and toe embracing wipers, of power operating mechanism organized to actuate the gripping means and advance the wipers to the edge of the last and then bring the machine to rest with the upper under tension and clamped by the wipers but not overwiped.

96. In a machine for working an upper over a last, the combination with means for positioning the last, means for gripping and tensioning the upper, and toe embracing wipers, of power operating mechanism organized to actuate the gripping means and advance the wipers to the edge of the last and then bring the machine to rest, and controlling means by which the wipers may be caused to overwipe the upper or the shoe may be released without completing the overworking operation.

97. In a machine for working an upper over a last, the combination with means for positioning the last, means for gripping and tensioning the upper, and toe embracing wipers, of power operating mechanism organized to actuate the gripping means and advance the wipers to the edge of the last and then bring the machine to rest with the upper under tension and clamped by the wipers but not overwiped, said mechanism being adapted to be restarted to effect completion of the overworking operation by power.

98. In a power toe lasting machine, shoe supporting means, toe embracing wipers, pincers, and operating mechanism organized to bring the machine to rest for inspection of the work at the end of the wiper closing movement and while the pincers are holding the upper under yielding tension, combined with means for causing the wipers to back off and repeat their advance while the pincers continue to hold the upper under yielding tension.

99. In a power toe lasting machine, shoe supporting means, toe embracing wipers, pincers arranged to continue to updraw the upper with yielding tension while the wipers advance, and means to cause the wipers to back off and then to repeat their advance while the upper is so held by the pincers.

100. In a power toe lasting machine, shoe supporting means, toe embracing wipers, pincers, and operating means arranged to lift the pincers while the wipers close.

101. In a power toe lasting machine, shoe supporting means, toe embracing wipers, pincers and operating means arranged to impart to the closed pincers a final updrawing impulse as the wipers approach the final limit of their closing movement.

102. In a power toe lasting machine, shoe supporting means, toe embracing wipers, pincers, and power operating mechanism responsive to manual control to effect gripping, pulling and upwiping of the upper about the toe of the shoe, then a return movement of the pincers and wipers, and then a repetition of the gripping, pulling and upwiping movement.

103. In a machine of the class described, in combination, a last and shoe support, a gripper to engage the upper at one end of the last, end lasting wipers, power operated mechanism organized automatically to clamp a last and shoe on said support and to effect relative movements of said support, gripper and wipers to cause said gripper to pull and stretch the upper at said end of the last, and to cause said wipers to upwipe and overwipe the upper at said end of the last, and manually controlled means for causing said power operated mechanism to effect the upwiping and overwiping operations as often as desired without releasing the last and shoe.

104. In a machine of the class described, in combination, a last and shoe support, a gripper to engage the upper at one end of the last, end lasting wipers, power operated mechanism organized automatically to effect relative movements of said support, gripper and wipers to cause said gripper to pull and tension the upper and to cause said wipers to upwipe the tensioned upper at said end of the last and to overwipe the upper, and manually controlled means for causing said power operated mechanism to effect the upwiping operation as often as desired without releasing the last and shoe or the tension on the gripped upper.

105. A power operated end lasting mechanism constructed and organized automatically to effect relative movements of a last, gripper and end lasting wipers to cause said gripper to pull and stretch the upper at the end of the last and to cause said wipers to upwipe and overwipe the upper at said end of the last, and having manually controlled means for causing said power operated mechanism to effect the upwiping operation as often as desired without releasing the last and shoe.

106. A power operated end lasting mechanism constructed and organized automatically to effect relative movements of a last, gripper and end lasting wipers to cause said gripper to pull and tension the upper at the end of the last and to cause said wipers to upwipe the tensioned upper over the end of the last and to overwipe and lay the upper over the edge of a sole on the last, and having manually controlled means for causing said power operated mechanism to effect the upwiping operation as often as desired without releasing the last and shoe or the tension on the gripped upper.

107. A power operated end lasting mechanism constructed and organized automatically to effect relative movements of a last, gripper and end lasting wipers to cause the gripper to pull and stretch the upper at the end of the last and to cause said wipers to upwipe and overwipe the upper at said end of the last, and having manually controlled means for causing said power operated mechanism to effect the overwiping operation as often as desired without releasing the last and shoe.

108. A power operated end lasting mechanism constructed and organized automatically to effect relative movements of a last, gripper and end lasting wipers in timed relation to cause said gripper to pull and tension the upper and to cause said wipers to upwipe and overwipe the upper at said end of the last, and having manually controlled means for causing said power operated mechanism to effect the upwiping and overwiping operations as often as desired without releasing the last and shoe.

109. A power operated end lasting mechanism constructed and organized automatically to effect relative movements of a last, upper gripper and end lasting wipers in timed relation to cause the gripper to pull and tension the upper at one end of the last and to cause said wipers to upwipe and overwipe the upper at said end of the last with the upper held under tension by the gripper, and having means under the control of the operator for causing said power operated mechanism to effect the upwiping and overwiping operations as often as desired without releasing the last and shoe and without releasing the tension of the gripper on the upper materials.

110. In a machine of the class described, organized to tension an upper on a last, to come to a stop before the completion of a work cycle with the upper under tension and to lay the upper over the margin of the shoe sole after the machine has been started a second time, the combination with upper tensioning means, of means for engaging the feather of the sole to position the sole in relation to the last, and means, independent of the upper tensioning means and operative after the machine has been started subsequently to the upper tensioning period of the cycle of operations, for moving said positioning means away from the feather of the sole.

111. In a machine of the class described, organized to tension an upper on a last at one end of the last, to come to a stop before the completion of a work cycle with the upper tension, and to lay the upper over the margin of the shoe sole at said end of the last after the machine has been started a second time, the combination with upper tensioning means, of means for engaging the feather of the sole at said end of the last to hold the sole down upon the bottom face of the last, and means, independent of the upper tensioning means and operative after the machine has been started a second time to lay the upper over the margin of the sole, for moving said feather holding means away from the feather of the sole.

112. A lasting machine having lasting mechanism comprising toe embracing wipers and shoe holding means organized for relative movement to enable the wipers to wipe the upper up the sides of the last and then to wipe the upper inwardly over the bottom of the last, combined with power mechanism for effecting said relative movement and manually controlled means by which the power mechanism may be made to repeat said relative movement to enable the wipers repeatedly to upwipe the upper without releasing the shoe.

In testimony whereof I affix my signature in presence of two witnesses.

CHARLES F. PYM.

Witnesses:
ANNA M. DORR,
LEWIS E. FLANDERS.

Corrections in Letters Patent No. 1,274,590.

It is hereby certified that in Letters Patent No. 1,274,590, granted August 6, 1918, upon the application of Charles F. Pym, of Essex, Ontario, Canada, for an improvement in "Lasting-Machines," errors appear in the printed specification requiring correction as follows: Page 15, line 15, claim 29, for the words "toward and" read *outwardly;* page 16, after line 99, insert the following claim as claim 46:

*46. In a machine of the character described, the combination of a pincer carrying member and means for actuating said pincer carrying member, of a carrying plate pivotally attached to the carrying member and having an opening therein forwardly of its pivot and slots formed concentric with said opening, pincers having a head provided with a stem engaging said opening in the plate, an operating rod for the pincers extending upward through one of the slots in the plate, a power actuated lever for moving the rod, a hand lever for moving the rod, and supporting means for the hand lever engaging the other slot in the carrying plate and adjustable therein.;* page 17, strike out lines 77 to 90, comprising claim 54 as now numbered; pages 16 and 17, renumber claims 46 to 53 as 47 to 54; and that the said Letters Patent should be read with these corrections therein that the same may conform to the record of the case in the Patent Office.

Signed and sealed this 22d day of October, A. D., 1918.

[SEAL.]
R. F. WHITEHEAD,
*Acting Commissioner of Patents.*

Cl. 12—14.